(12) United States Patent
Shiohara

(10) Patent No.: US 12,282,691 B2
(45) Date of Patent: Apr. 22, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tetsuya Shiohara, Nagano (JP)

(*) Notice: Subject to any disclaimer, the term of this patent is extended or adjusted under 35 U.S.C. 154(b) by 0 days.

(21) Appl. No.: 18/358,686

(22) Filed: Jul. 25, 2023

(65) Prior Publication Data

US 2024/0036776 A1 Feb. 1, 2024

(30) Foreign Application Priority Data

Jul. 29, 2022 (JP) .................................. 2022-121179

(51) Int. Cl.
*G06F 3/12* (2006.01)
*H04N 1/00* (2006.01)

(52) U.S. Cl.
CPC .......... *G06F 3/1205* (2013.01); *G06F 3/1259* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 11,550,522 B2* | 1/2023 | Ichikawa | G06F 3/1239 |
| 11,656,810 B2* | 5/2023 | Tokumoto | G06F 3/1253 |
| | | | 358/1.13 |
| 2004/0190057 A1* | 9/2004 | Takahashi | G06F 3/1205 |
| | | | 358/1.15 |
| 2006/0224876 A1* | 10/2006 | Kato | G06F 9/4411 |
| | | | 713/1 |
| 2015/0212772 A1 | 7/2015 | Asano | |
| 2016/0216919 A1 | 7/2016 | Zakharov | |
| 2019/0385122 A1 | 12/2019 | Kurahashi | |

FOREIGN PATENT DOCUMENTS

JP 2019074906 A 5/2019

* cited by examiner

*Primary Examiner* — Darryl V Dottin
(74) *Attorney, Agent, or Firm* — Canon U.S.A., Inc. IP Division

(57) ABSTRACT

An information processing apparatus including an application configured to perform extension of a function provided by print data generation software configured to be used in common by a plurality of different printing apparatuses includes an acquisition unit configured to acquire information regarding a type of a printing apparatus connected to the information processing apparatus, and a display unit configured to display a screen with a configuration customized in accordance with the type of the printing apparatus that has been acquired by the acquisition unit.

24 Claims, 17 Drawing Sheets

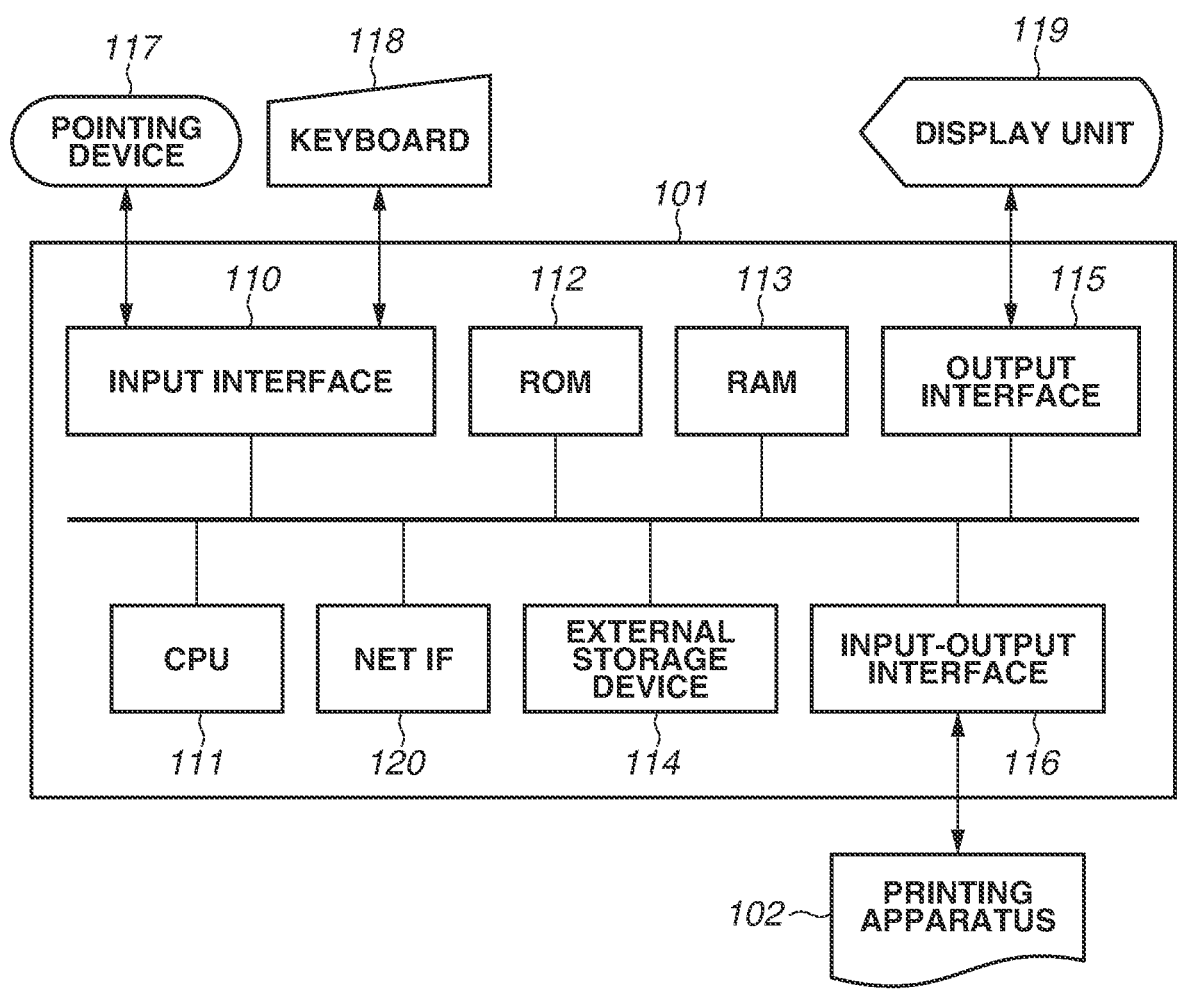

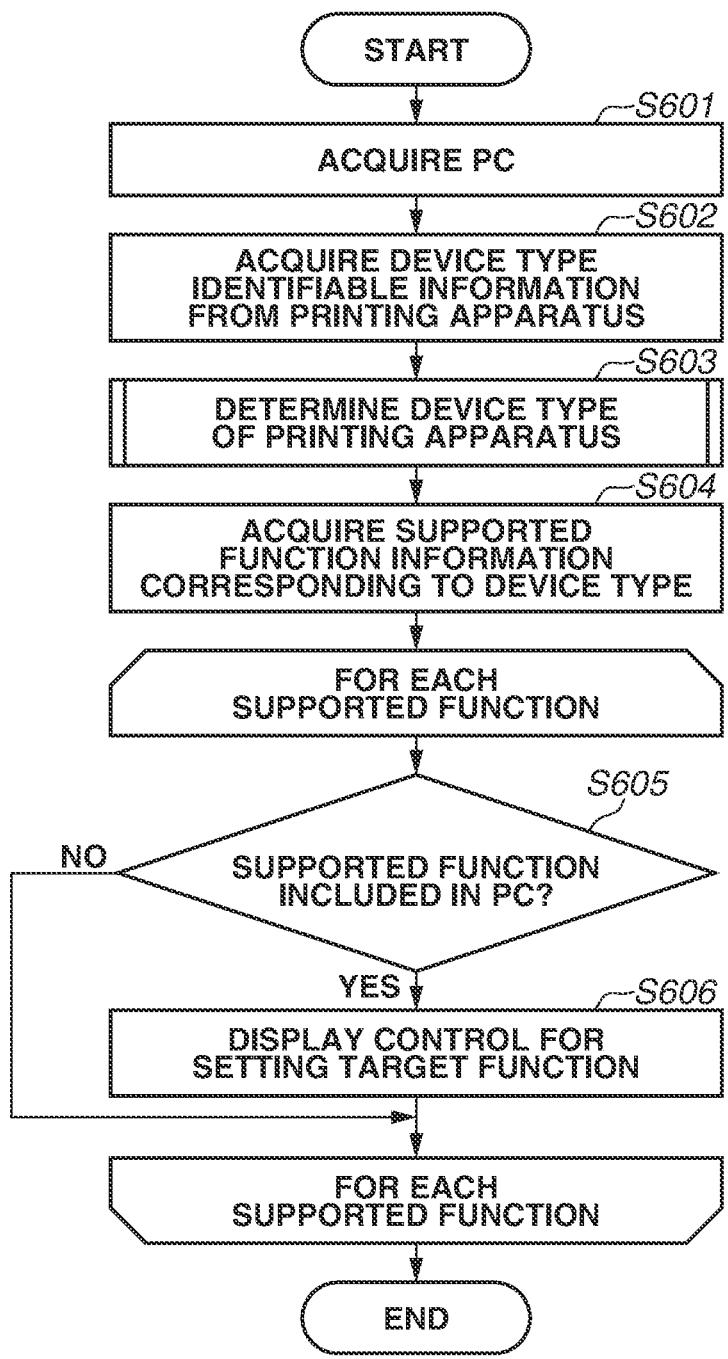

FIG.8

```
<psf:PrintCapabilities ...>
 <psf:Feature name="psk:PageMediaSize">
  ...
  <psf:Option name="psk:NorthAmericaLetter" constrained="psk:None">
   <psf:ScoredProperty name="psk:MediaSizeWidth">
    <psf:Value xsi:type="xsd:integer">215900</psf:Value>
   </psf:ScoredProperty>
   <psf:ScoredProperty name="psk:MediaSizeHeight">
    <psf:Value xsi:type="xsd:integer">279400</psf:Value>
   </psf:ScoredProperty>
  </psf:Option>
  <psf:Option name="psk:NorthAmericaLetter" constrained="psk:None">
   <psf:ScoredProperty name="psk:ISO A4">
    <psf:Value xsi:type="xsd:integer">210000</psf:Value>
   </psf:ScoredProperty>
   <psf:ScoredProperty name="psk:MediaSizeHeight">
    <psf:Value xsi:type="xsd:integer">297000</psf:Value>
   </psf:ScoredProperty>
  </psf:Option>
 </psf:Feature>
 <psf:Feature name="psk:PageMediaType">
  ...
  <psf:Option name="psk:Plain" constrained="psk:None"/>
  <psf:Option name="psk:PhotoPaper" constrained="psk:None"/>
 </psf:Feature>
 <psf:Feature name="psk:PageOrientation">
  ...
  <psf:Option name="psk:Portlait" constrained="psk:None"/>
  <psf:Option name="psk:Landscape" constrained="psk:None"/>
 </psf:Feature>
 <psf:Feature name="psk:JobNUpAllDocumentsContiguously">
  <psf:Option name="ns0000:None" constrained="psk:None"/>
  <psf:Option name="ns0000:PagePerSheet_2" constrained="psk:None"/>
  <psf:Option name="ns0000:PagePerSheet_4" constrained="psk:None"/>
 </psf:Feature>
 ...
</psf:PrintCapabilities>
```

FIG.14

| INKJET DEVICE | LASER BEAM DEVICE | OTHER DEVICES |
|---|---|---|
| SHEET TYPE | SHEET SIZE | SHEET TYPE |
| SHEET SIZE | PRINTING ORIENTATION | SHEET SIZE |
| PRINTING ORIENTATION | SHEET TYPE | PRINTING ORIENTATION |
| SHEET TRAY | SHEET TRAY | SHEET TRAY |
| REVERSE ORDER PRINTING | PRINT WITH EXPANDED PRINT AREA | |
| BORDERLESS PRINTING | STAPLE | |
| TWO-SIDED PRINTING | HOLE PUNCH | |
| | TWO-SIDED PRINTING | |

| STATUS | INKJET DEVICE | LASER BEAM DEVICE |
|---|---|---|
| PRINTING | NOW PRINTING. | NOW PRINTING. |
| PAPER EMPTY ERROR | NO SHEET IS SET. SHEETS NEED TO BE SET. | EMPTY SHEET FEED UNIT EXISTS. |
| INK EMPTY | INK MIGHT RUN OUT. | — |
| TONER EMPTY | — | TONER MIGHT RUN OUT. |
| OTHER ERRORS | ERROR HAS OCCURRED. CHECK STATE OF PRINTER. | ERROR HAS OCCURRED. CHECK STATE OF PRINTER. |

1501

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

There has been known a configuration of issuing a print instruction to a printing apparatus connected to a host computer, using a printer driver installed on the host computer as control software for the printing apparatus. On the host computer, an operating system (OS) being basic software is installed. The printer driver is configured in accordance with the specification defined by the OS, and operates by being invoked from the OS. By providing a printer driver adapted to the specification of the OS, a vendor of a printing apparatus can provide a way to issue an instruction to the printing apparatus using the OS.

In recent years, a standard class driver (hereinafter, also referred to as a "standard driver") that can be used in common by printing apparatuses provided by a plurality of vendors has been provided in Windows®. Such a standard driver is supplied in a package of an OS, and it easily becomes usable when an arbitrary printing apparatus is connected to a host computer. It is therefore unnecessary to additionally install a printer driver unique to a model that is suitable for the printing apparatus. The standard driver is accordingly highly convenient. The standard driver is also configured to designate a print function in accordance with Print Device Capabilities (hereinafter, "PDC") generated based on information acquired from a connected printing apparatus. With this configuration, users who use the standard driver can designate a print function adapted to the capability of the connected printing apparatus, although the users use one standard driver.

A function extension application (hereinafter, also referred to as an "extension application") can be associated with the standard driver. The extension application can be provided by a vendor that provides a printing apparatus. By editing the PDC generated by the standard driver, the extension application can provide a function (extended function) that cannot be implemented only by the standard driver. Japanese Patent Application Laid-Open NO. 2019-74906 discusses a technique of extending a function, such as a stamp function, by using an extension application.

The extension application discussed in Japanese Patent Application Laid-Open NO. 2019-74906 can edit a spool file. By editing the spool file, the extension application can implement an N-in-1 print function, for example. The object is to provide an appropriate user interface (UI) to adequately fulfill the function of the extension application that extends the function of the standard driver.

SUMMARY OF THE INVENTION

According to an aspect of the present invention, an information processing apparatus including an application configured to perform extension of a function provided by print data generation software configured to be used in common by a plurality of different printing apparatuses includes an acquisition unit configured to acquire information regarding a type of a printing apparatus connected to the information processing apparatus, and a display unit configured to display a screen with a configuration customized in accordance with the type of the printing apparatus that has been acquired by the acquisition unit.

Further features of the present invention will become apparent from the following description of exemplary embodiments with reference to the attached drawings.

BRIEF DESCRIPTION OF THE DRAWINGS

FIG. 1 is a block diagram illustrating a hardware configuration of a printing system.

FIG. 6 is a diagram illustrating a processing flow for displaying the print setting screen with the print setting screen extension unit.

FIG. 8 is a diagram illustrating an example of Print Capabilities ("PC") generated by print data generation software.

FIG. 14 is a diagram illustrating an example of supported function information.

FIG. 15 is a diagram illustrating an example of status message information.

DESCRIPTION OF THE EMBODIMENTS

Figure 2A:
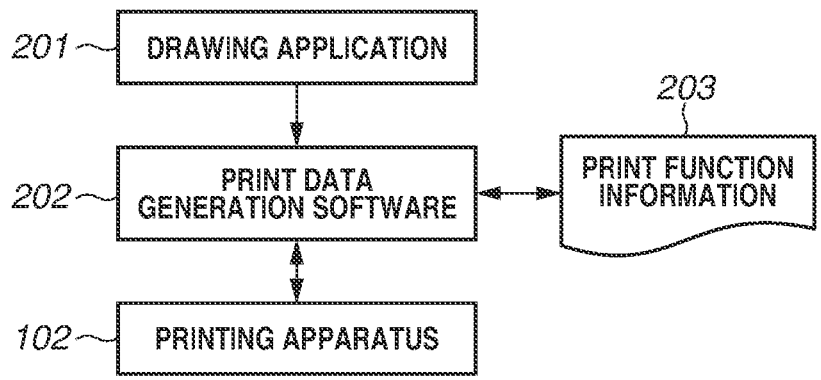
FIGS. 2A and 2B are block diagrams illustrating software configurations of the printing system.

Hereinafter, an exemplary embodiment of the present invention will be described in detail with reference to the attached drawings. The following exemplary embodiment is not intended to limit the present invention set forth in the appended claims. In addition, not all the combinations of features described in the present exemplary embodiment are essential to the solution of the present invention. The same components are assigned the same reference numerals, and the description will be omitted.

<Hardware Configuration of Printing System>

FIG. 1 is a block diagram illustrating a hardware configuration of a printing system according to a first exemplary embodiment. In FIG. 1, a host computer 101 is an example of an information processing apparatus including an input interface 110, a central processing unit (CPU) 111, a read-only memory (ROM) 112, a random access memory (RAM) 113, an external storage device 114, an output interface 115, and an input-output interface 116. Input devices, such as a keyboard 118 and a pointing device 117, are connected to the input interface 110. A display device, such as a display unit 119, is connected to the output interface 115. A network interface (NET IF) 120 performs control for performing data transfer with an external device via a network.

The ROM 112 stores an initialization program. The external storage device 114 stores an application program group, an operating system (OS), print data generation software, and other various types of data. The RAM 113 is used as a work memory when various programs stored in the external storage device 114 are executed, and the various programs are made operable in the host computer 101.

In the present exemplary embodiment, the CPU 111 performs processing in accordance with procedures of programs stored in the ROM 112, thereby executing functions of the host computer 101, which will be described below, and processing regarding the flowcharts to be described below. A printing apparatus 102 as a device is connected with the host computer 101 via the input-output interface 116. In FIG. 1, the host computer 101 and the printing apparatus 102 are formed as separate devices, but these devices can be formed as one information processing apparatus. An inkjet printer that performs printing by ejecting ink onto a sheet surface will be described as an example of the printing apparatus 102, but another method (e.g., electrophotographic method) can be used to execute printing. In addition, the host computer 101 can be a desktop personal computer, a smartphone, or a laptop personal computer.

<Software-Centered Configuration of Printing System>

Figure 2B:
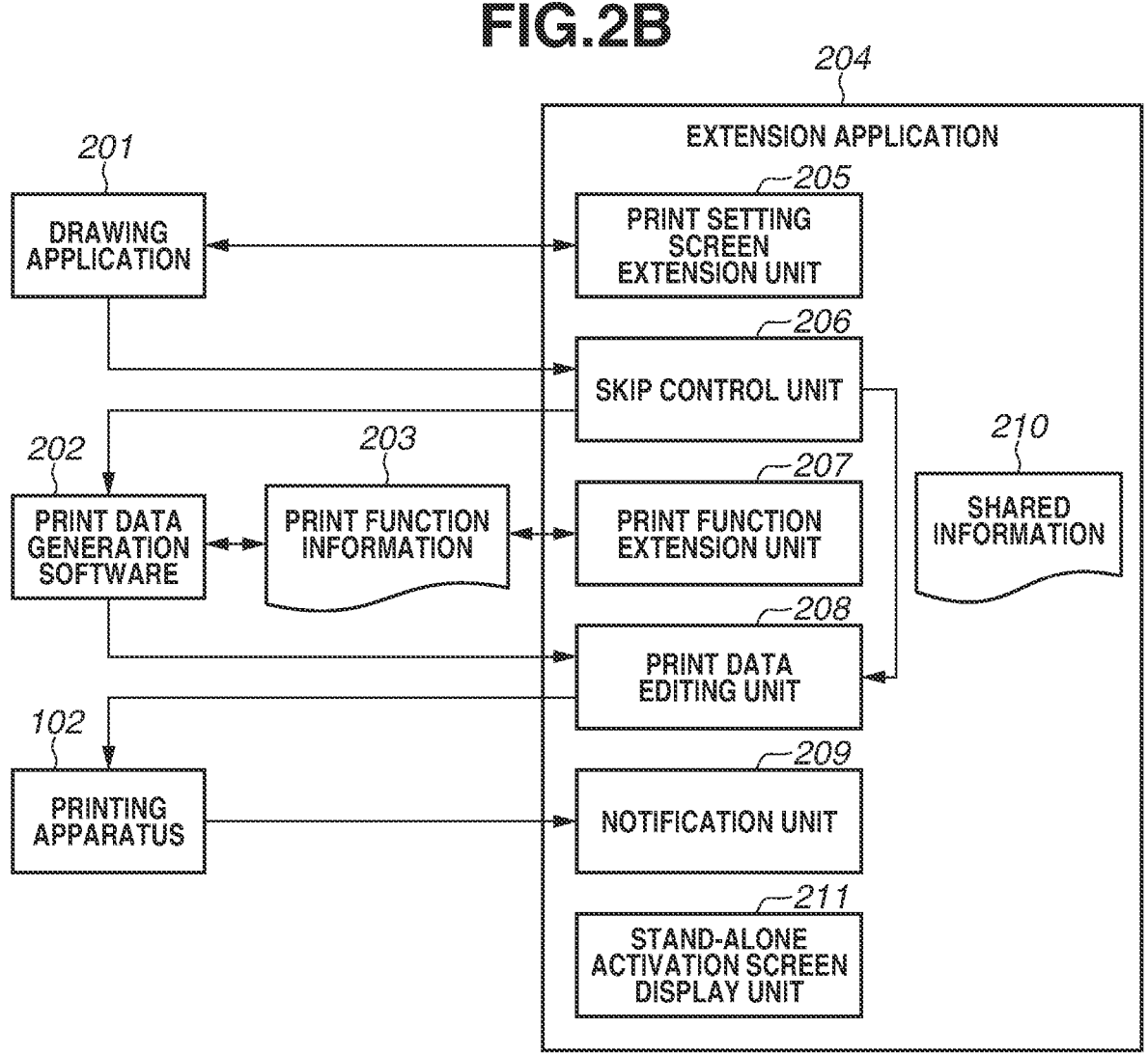

FIGS. 2A and 2B are diagrams schematically illustrating a software configuration of the printing system. The description will be given on the premise of a printing system including the host computer 101 on which Windows® 11 of Microsoft® is installed as an OS.

FIG. 2A is a diagram illustrating a typical configuration of a case where an extension application 204 is not associated with print data generation software 202 and the printing apparatus 102. A drawing application 201 is software that creates content (drawing data) to be printed. For example, the drawing application 201 includes a document creation application and a spreadsheet application. If the drawing application 201 receives a print request from a user, the drawing application 201 issues a print instruction to the OS.

The print instruction includes print setting information for issuing operation instructions of the print data generation software 202 and the printing apparatus 102. The print setting information will also be referred to as Print Ticket (hereinafter, "PT").

To output print setting information, the drawing application 201 can display a print setting screen provided by any of the print data generation software 202, the OS, and the drawing application 201. The print setting screen includes a setting item (hereinafter, also referred to as a "control item") indicating a settable print function, and a control item indicating a setting value thereof, in accordance with capability information (information settable as a print setting) acquired from the print data generation software 202. The capability information will also be referred to as Print Capabilities (hereinafter, "PC").

The print data generation software 202 determines PC based on print function information 203. The print function information 203 is print function data in which all settable print functions and their setting values, and exclusive relationship between setting values are described. The print function information 203 will also be referred to as Print Device Capabilities (PDC). The PDC 203 is included in a configuration file of the print data generation software 202, and stored in the external storage device 114 as an unchangeable file. Alternatively, the PDC 203 can also be dynamically generated by the print data generation software 202. Specifically, the print data generation software 202 or the OS can be configured to acquire printing apparatus attribute data from the printing apparatus 102, and generate the PDC 203 in accordance with attribute information in the acquired printing apparatus attribute data. In a case where the PDC 203 is dynamically generated, the generated PDC 203 is editable. The printing apparatus attribute data to be acquired from the printing apparatus 102 is a response to be acquired by issuing a Get-Printer-Attributes operation of an Internet Print Protocol (IPP) to the printing apparatus 102. The response includes attribute information indicating a function that can be designated in the printing apparatus 102 (capability of the printing apparatus 102), and a setting value related to the attribute information. The response is stored in the RAM 113.

With this configuration, the print data generation software 202 can enable the user to designate a print function usable in a corresponding printing apparatus 102, in accordance with a connected printing apparatus 102. In other words, even in a case where a printing apparatus having a different function or a printing apparatus developed by a different vendor is connected, the print data generation software 202 can enable the user to designate a usable print function in accordance with the connected printing apparatus.

The description will now be given of the configuration that uses an IPP Class Driver installed on Windows® 11, as the print data generation software 202. The IPP Class Driver is a printer driver that executes printing processing in accordance with the specification of a standard print protocol called an IPP, and is supplied within a package of the OS. The IPP Class Driver is not a unique printer driver suited to a model of the printing apparatus 102, but a standard class driver that can be used in common by a plurality of printing apparatuses irrespective of a vendor or a model. The IPP Class Driver acquires capability information of a connected printing apparatus 102 and generates the PDC 203 based on the acquired capability information in such a manner that the user can designate a print function supported by the connected printing apparatus 102. In the present exemplary embodiment, a printing mode that uses the IPP Class Driver will also be described as Local Print. In addition, a Universal Print (UP) Class Driver installed on Windows® 11 can also be used as the print data generation software 202. The UP Class Driver is a printer driver to be used in Universal Print, which is one mode of cloud print for performing printing via a server.

The OS generates intermediate data (also referred to as input data) based on a print instruction output from the drawing application 201, and delivers the intermediate data to the print data generation software 202. The data to be output for printing by the drawing application 201 is data in a Graphic Device Interface (GDI) format or data in an Extensible Markup Language (XML) Paper Specification (XPS) format. In a case where the IPP Class Driver is used as the print data generation software 202, the OS converts the GDI format data output from the drawing application 201 into XPS format data if data output by the drawing application 201 is GDI format data. The OS then delivers the converted XPS format data to the print data generation software 202 as intermediate data. If data output by the drawing application 201 is XPS format data, the OS delivers the XPS format data to the print data generation software 202 as intermediate data. The intermediate data includes drawing data as information regarding a picture (image) to be formed onto a sheet surface, and print setting information set by the user.

The print data generation software 202 converts the acquired intermediate data into print data interpretable by the printing apparatus 102, and transmits the print data to the printing apparatus 102. The print data includes drawing data as information regarding a picture (image) to be formed onto a sheet surface, and print setting attribute information generated based on print setting information set by the user (attribute information designating a print setting). The print setting attribute information includes attribute information indicating a function that can be designated in the printing apparatus 102 (capability of the printing apparatus 102), and a setting value related to the attribute information.

The printing apparatus 102 performs printing onto a sheet surface based on the print data transmitted from the print data generation software 202. At this time, the printing apparatus 102 forms drawing data included in print data, onto the sheet surface by an operation following the print setting attribute information included in the print data. The print setting attribute information includes attribute information for designating print quality (e.g., image quality priority, and speed priority) and two-sided printing, and its setting value. For example, in a case where the print setting attribute information includes attribute information for designating two-sided printing, and a setting value indicating that the two-sided printing is to be operated, the printing apparatus 102 executes two-sided printing.

FIG. 2B is a diagram illustrating a configuration of a case where the extension application 204 is associated with the print data generation software 202 and the printing apparatus 102. The components and processing that are not specifically noted below are similar to those in FIG. 2A.

The extension application 204 is software for extending the function of the print data generation software 202, and is software not preliminarily included in the OS (not supplied within the package). Thus, the user needs to download and install the extension application 204 from a server via the Internet by operating the host computer 101. Alternatively, the extension application 204 can be automatically installed based on the connection of the printing apparatus 102 to the host computer 101. Specifically, in a case where the printing apparatus 102 is connected to the host computer 101, the OS acquires device identification information from the printing apparatus 102. The OS can download and install the extension application 204 suitable for the acquired device identification information, from a server via the Internet. That is, the print data generation software 202 and the extension application 204 are held in the host computer 101 as separate files.

The print data generation software 202 and the extension application 204 are sometimes updated and upgraded in version. The update processing is performed at different timings. That is, a timing at which an update file of the print data generation software 202 is acquired by the host computer 101, and a timing at which an update file of the extension application 204 is acquired are different. In addition, a trigger by which an update file of the print data generation software 202 is acquired by the host computer 101, and a trigger by which an update file of the extension application 204 is acquired are different as well. In a case where the extension application 204 is installed, the OS associates the extension application 204 with the print data generation software 202 and the printing apparatus 102.

The extension application 204 to be described in the present exemplary embodiment includes a print setting screen extension unit 205, a skip control unit 206, a print function extension unit 207, a print data editing unit 208, a notification unit 209, and a stand-alone activation screen display unit 211. The extension application 204 also includes shared information 210 that can be accessed in common from these units. The shared information 210 corresponds to a file stored in the external storage device 114 or information stored in the RAM 113. By using an application program interface (API) provided by the OS, the extension application 204 writes or reads out information into or from the shared information 210.

The extension application 204 can end an operation each time processing of each unit ends. In this case, each time a request to use each unit is received, the OS activates the extension application 204. Another configuration can also be considered. For example, if the processing of the print setting screen extension unit 205 ends, the OS ends the operation of the extension application 204, but the OS can leave the extension application 204 in an activated state even if the processing of the skip control unit 206 ends. Furthermore, the extension application 204 can cancel processing during the processing of each unit. In a case where processing is cancelled, an in-process job on a printing queue is deleted by the OS.

If the drawing application 201 receives a print request from the user, the drawing application 201 issues a print instruction to the OS. Also under this configuration, the drawing application 201 can display a print setting screen similarly to the configuration illustrated in FIG. 2A. Under this configuration, a print setting screen provided by the extension application 204 is displayed. Specifically, a print setting screen provided by the print setting screen extension unit 205 included in the extension application 204 is displayed. Whether a print setting screen provided by the print setting screen extension unit 205 is displayed depends on the operation of the user. The details of the print setting screen extension unit 205 will be described below with reference to FIG. 4.

If the drawing application 201 receives a print request from the user and a print instruction is issued to the OS, the OS activates the skip control unit 206. The skip control unit 206 controls whether to skip the processing of the print data generation software 202. After the skip control processing executed by the skip control unit 206, the OS generates intermediate data based on the print instruction output from the drawing application 201, and the intermediate data is delivered to the print data generation software 202. In a case where skip control is not performed by the skip control unit 206, the intermediate data is processed by the print data generation software 202 into print data interpretable by the printing apparatus 102, and the intermediate data is delivered to the print data editing unit 208. In contrast, in a case where the processing of the print data generation software 202 is skipped, the intermediate data is delivered to the print data editing unit 208 without being processed by the print data generation software 202. It accordingly becomes possible to process intermediate data in the print data editing unit 208.

The print data editing unit 208 edits intermediate data delivered from the print data generation software 202 or print data processed by the print data generation software 202. Editing to be executed by the print data editing unit 208 will be described using N-in-1 printing as an example. The print data editing unit 208 changes the layout of intermediate data or print data based on print setting information of N-in-1 printing that has been received from the OS. The print data editing unit 208 can also display a user interface (UI) screen on the display unit 119, and provide a function of displaying a layout result of intermediate data or print data as a preview screen. In a state in which a graphical user interface (GUI) screen displayed by the print data editing unit 208 on the display unit 119 remains in an opened state, print data is not transmitted to the printing apparatus 102. By closing the GUI screen, print data transmission processing operates.

After the print data editing unit 208 has edited print data, the print data is delivered to the printing apparatus 102. The printing apparatus 102 performs printing onto a sheet surface based on the received print data.

In a case where the processing of the print data generation software 202 has been skipped by the skip control unit 206, the print data editing unit 208 can convert received intermediate data into print data interpretable by the printing apparatus 102. To convert intermediate data into print data, a function provided by the OS may be used.

The extension application 204 includes the print function extension unit 207. The print function extension unit 207 can edit the PDC 203 generated by the print data generation software 202 or the OS. The print function extension unit 207 can thereby add a function provided by the extension application 204, add a function supported by the printing apparatus 102 but unsupported by the print data generation software 202, and add exclusive relationship between setting values of a print function. When the extension application 204 is associated with the printing apparatus 102 and the print data generation software 202 for the first time, the OS activates the print function extension unit 207. The OS can also activate the print function extension unit 207 at other timings, such as an activation timing of the OS. With this configuration, in a case where an optional device (e.g., finisher) is added to the printing apparatus 102 later, and a function related to printing is extended, the print function extension unit 207 can detect an extended function and add the extended function to the PDC 203.

The extension application 204 also includes the notification unit 209. The notification unit 209 can display a notification to the user in response to error occurrence of the printing apparatus 102. For example, if a paper empty error occurs in the printing apparatus 102, the print data generation software 202 detects the paper empty error, and the OS displays a message on the display unit 119 using a notification function called toast notification, which is a function of the OS. If the user presses the toast notification, the notification unit 209 of the extension application 204 is invoked by the OS, and a UI screen of the notification unit 209 is displayed. On the UI screen of the notification unit 209, for example, a detailed message of the paper empty error or a sheet loading method can be displayed. If the extension application 204 once transmits print data to the printing apparatus 102, screen display, such as guidance associated with print data, cannot be performed during the processing of each unit.

The extension application 204 also includes the stand-alone activation screen display unit 211. While the extension application 204 operates in cooperation with the print data generation software 202, the extension application 204 can also operate independently. By the user issuing an instruction to activate the extension application 204, the stand-alone activation screen display unit 211 of the extension application 204 is invoked, and a UI screen of the stand-alone activation screen display unit 211 is displayed.

The configuration of the extension application 204 for realizing the present exemplary embodiment is not limited to the configuration including all of the above-described functions (units), and can be a configuration including only a part of the functions, or a configuration including another function. The extension application 204 will sometimes simply be referred to as printing software. As described above, it can be said that the extension application 204 includes a function (stand-alone activation screen display unit 211) of displaying a UI screen in response to an activation instruction from the user, and at least one of a function (print setting screen extension unit 205) of displaying a setting screen in cooperation with the print data generation software 202, a function (skip control unit 206) of controlling whether to skip the processing of the print data generation software 202, a function (print data editing unit 208) of editing print data input to the printing apparatus 102, a function (print function extension unit 207) of extending a function that can be designated in the print data generation software 202, and a function (notification unit 209) of displaying a screen in response to error occurrence of the printing apparatus 102.

Example of Screen to Be Displayed by
Stand-Alone Activation Screen Display Unit

Figure 3:
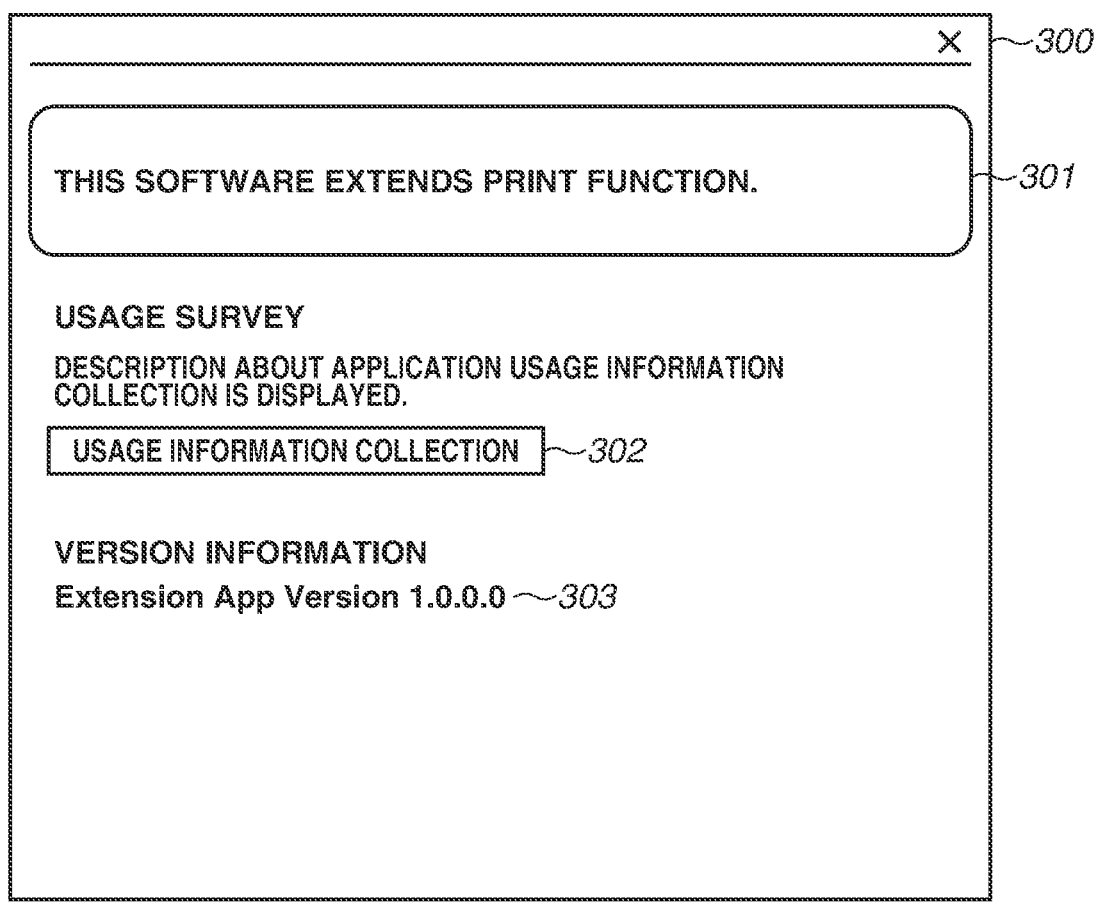
FIG. 3 is a diagram illustrating an example of a stand-alone activation screen to be displayed by a stand-alone activation screen display unit.

A UI screen to be displayed by the stand-alone activation screen display unit 211 will now be described with reference to FIG. 3. A stand-alone activation screen 300 illustrated in FIG. 3 is an example of a UI screen to be displayed by the stand-alone activation screen display unit 211 when the user issues an instruction to activate the extension application 204. In the present exemplary embodiment, the extension application 204 is intended to extend the function of the print data generation software 202, and thereby the stand-alone activation screen 300 includes only minimum requisite functions. A display region 301 is a region for displaying the description about the role of the extension application 204. The extension application 204 is assumed to be automatically installed based on the connection of the printing apparatus 102 to the host computer 101.

The extension application 204 might be installed without the intent of the user, and therefore the display region 301 is provided so that the user can recognize what is to be executed by the extension application 204, when the user activates the extension application 204. A control 302 is an acceptance dialog activation button. By the control 302 being pressed, a dialog is displayed for confirming acceptance of a usage survey. A common activation screen is displayed in response to the activation of the extension application 204 irrespective of a device type (laser beam device, inkjet device) to be described below.

Figure 4:
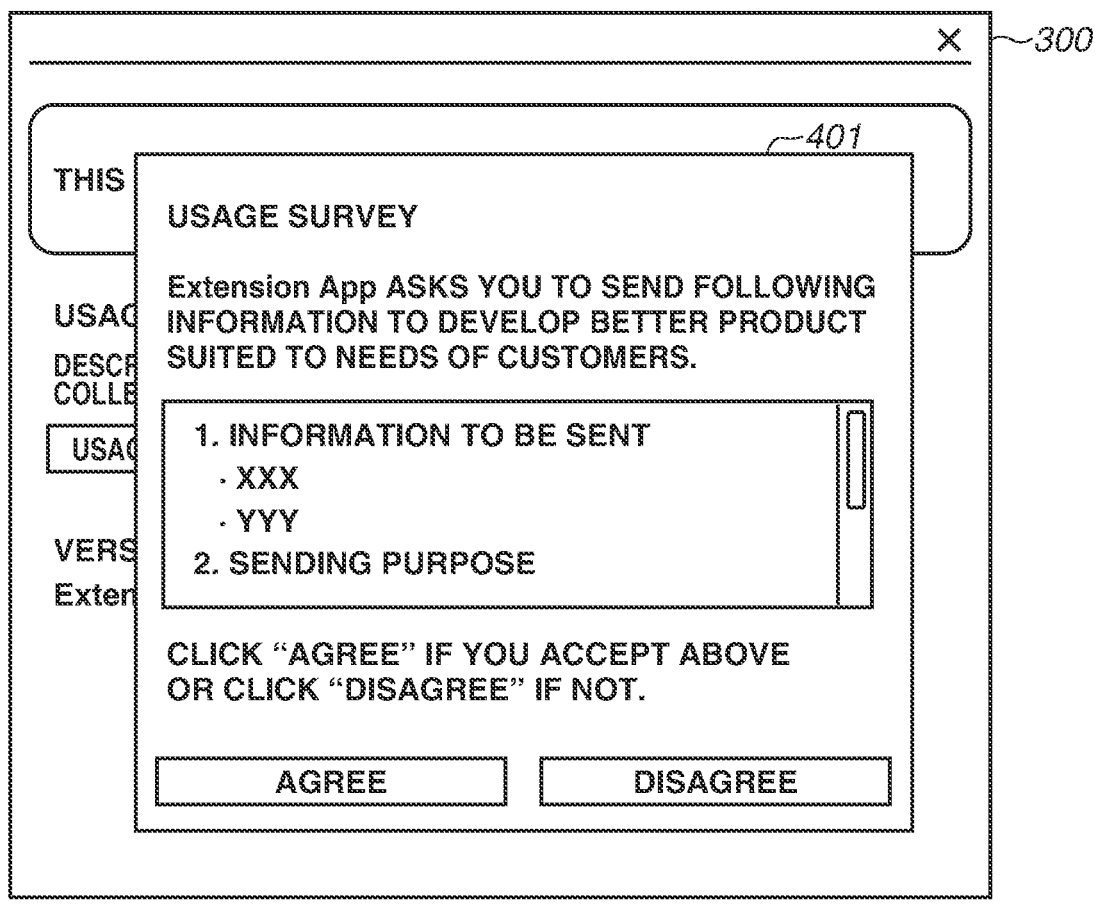
FIG. 4 is a diagram illustrating an example of an acceptance dialog to be displayed on the stand-alone activation screen.

FIG. 4 is a diagram illustrating a state in which a usage survey acceptance dialog is displayed on the stand-alone activation screen 300. If the control 302 is pressed, an acceptance dialog 401 is activated.

After confirming a message displayed on the acceptance dialog 401, the user selects whether to agree with the message. In a case where the user has selected "agree", the extension application 204 collects information by transmitting an operation performed by the user or environment information of the host computer 101 on which the extension application 204 has been installed, to a server. An application vendor uses the collected information for the improvement of the extension application 204. In a case where the user has not selected "agree" on the acceptance dialog 401, the extension application 204 does not execute the above-described information collection. The acceptance dialog 401 can be displayed when the stand-alone activation screen 300 is activated for the first time, in addition to being displayed upon the press of the control 302. By displaying the acceptance dialog 401 at the initial activation timing, the extension application 204 can more surely confirm whether the user agrees with the information collection. A display region 303 is a region for displaying version information of the extension application 204.

Example of Screen to Be Displayed by Print Setting Screen Extension Unit

Figure 5A:
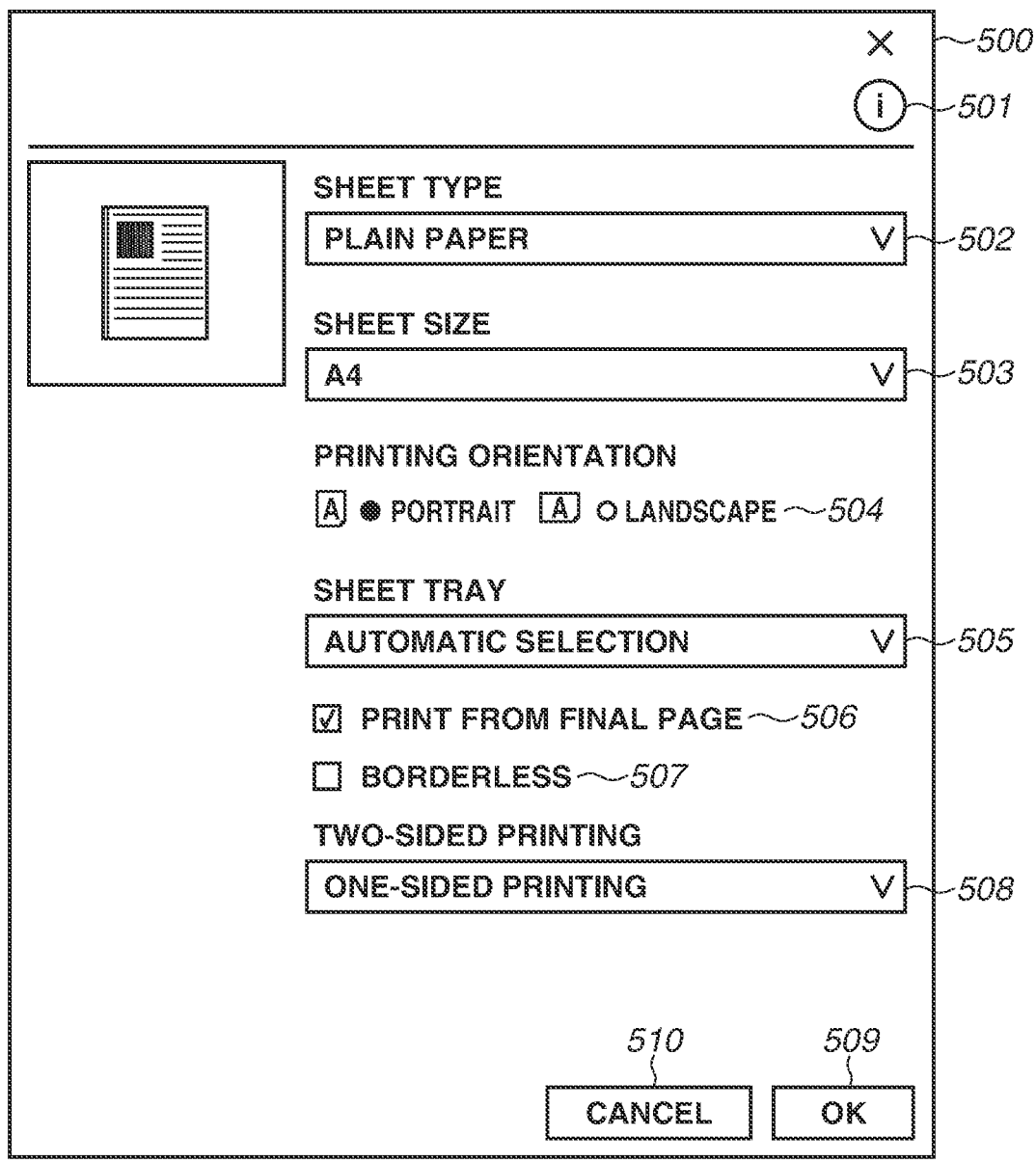
FIGS. 5A and 5B are diagrams each illustrating an example of a print setting screen to be displayed by a print setting screen extension unit.
Figure 5B:
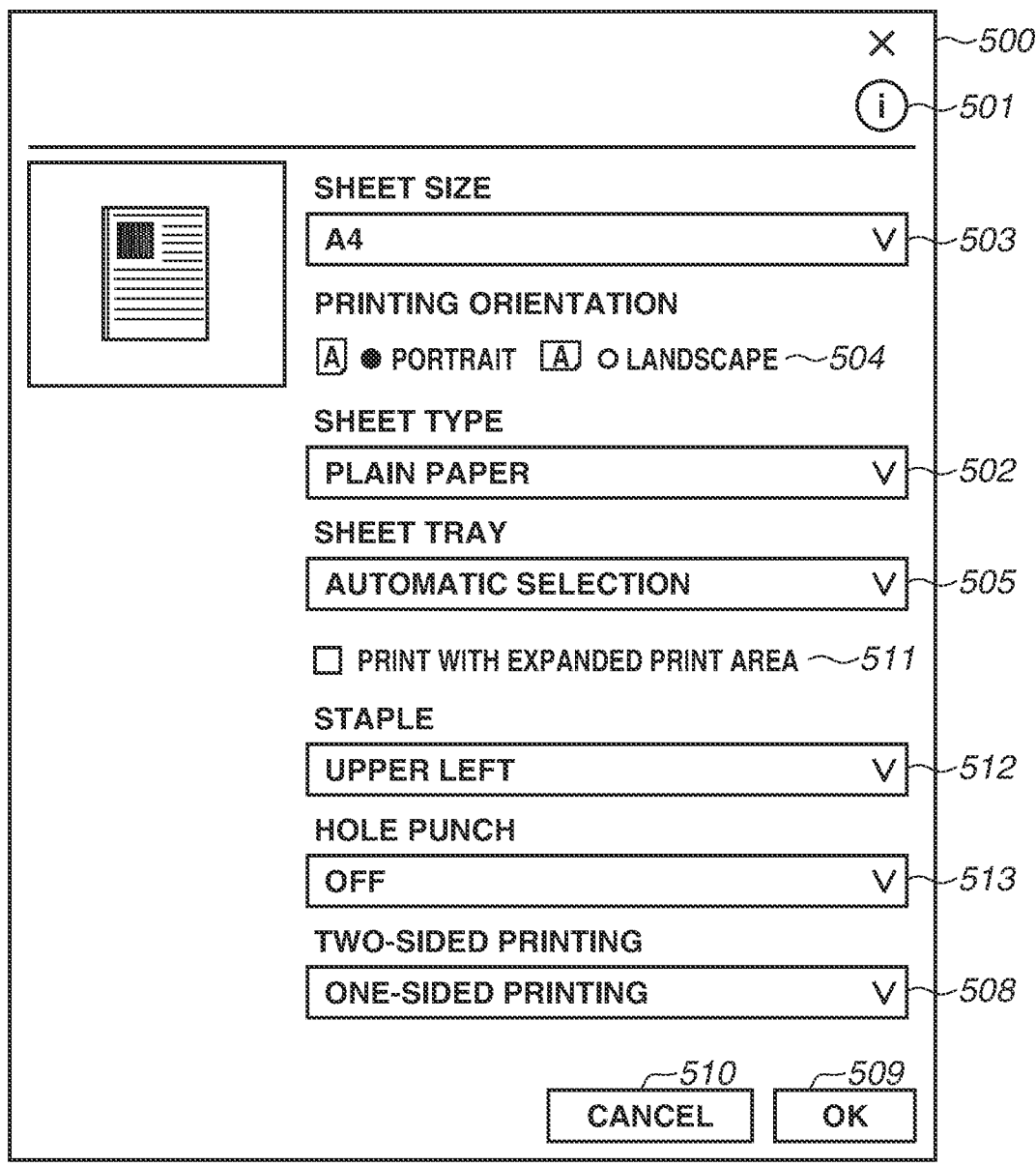

A print setting screen to be displayed by the print setting screen extension unit 205 will now be described with reference to FIGS. 5A and 5B. A print setting screen 500 illustrated in FIGS. 5A and 5B is an example of a screen to be display by the print setting screen extension unit 205 based on generated PC. The print setting screen extension unit 205 is invoked from the OS in a case where the user issues an instruction to display a print setting screen, on the drawing application 201. Based on PC that can be acquired from the OS, the print setting screen extension unit 205 displays a screen on which the user can designate a setting value of a print function that can be designated in the print data generation software 202.

The print setting screen 500 illustrated in FIG. 5A is an example of a screen to be displayed by the print setting screen extension unit 205 in a case where an inkjet device is associated as the printing apparatus 102. A control 501 is an activation button for a stand-alone activation screen. If the control 501 is pressed, the stand-alone activation screen display unit 211 displays the stand-alone activation screen 300. In a case where the stand-alone activation screen 300 is displayed for the first time, the stand-alone activation screen display unit 211 also displays the usage survey acceptance dialog 401 together. In a case where the extension application 204 is automatically installed based on the connection of the printing apparatus 102, the user is considered to be unaware of the installed extension application 204, and not activate the stand-alone activation screen 300. For this reason, the control 501 for activating the stand-alone activation screen 300 that is arranged on the print setting screen 500 contributes to enhancement in an acceptance rate of a usage survey.

A control 502 is a control item for enabling the setting of the type of a sheet to be used in printing. For example, an item, such as plain paper or photo paper, can be set. A control 503 is a control item for enabling the setting of a size of a sheet to be used in printing. For example, an item, such as A4 or Letter, can be set. A control 504 is a control item for enabling the setting of printing orientation, and portrait and landscape can be set. A control 505 is a control item for enabling the setting of a sheet feeding port of a print sheet of the printing apparatus 102. For example, an item, such as a main tray or a rear tray, can be set. A control 506 is a control item for enabling switching between on and off of reverse order printing. A control 507 is a control item for enabling switching between on and off of borderless printing. A control 508 is a control item for enabling the setting of two-sided printing. For example, one-sided printing, two-sided printing (long edge), and two-sided printing (short edge) can be set. A control 509 is an OK button. By the control 509 being pressed, the screen is closed with the setting being reflected. A control 510 is a cancel button. By the control 510 being pressed, the screen is closed without the setting being reflected.

The print setting screen 500 illustrated in FIG. 5B is an example of a screen to be displayed by the print setting screen extension unit 205 in a case where a laser beam device (e.g., a laser printer) is associated as the printing apparatus 102. Controls 501 to 510 are the same as those on the print setting screen 500 illustrated in FIG. 5A, and thus the description will be omitted.

A control 511 is a control item for enabling switching between on and off of borderless printing. The control 511 is a control for making the same setting as the control 507, but its function name is described as "print with expanded print area". Even in a case where the same setting is used, how the function is presented to the user sometimes varies between the inkjet device and the laser beam device. Thus, function names of the controls 507 and 511 are switched in accordance with a device type. A control 512 is a control item for enabling the setting of a staple position. A control 513 is a control item for enabling the setting of hole punch. The controls 512 and 513 are not included in the print setting screen 500 illustrated in FIG. 5A.

The print setting screens 500 illustrated in FIGS. 5A and 5B differ in configuration. In other words, the print setting screens 500 illustrated in FIGS. 5A and 5B differ in a print setting to be displayed, a function name to be displayed, and an arrangement order of controls for changing print settings. A sheet type, a sheet size, printing orientation, a sheet tray, and the setting of two-sided printing can be set irrespective of the device type. The reverse order printing can be set only when an inkjet device is used. The settings of staple and hole punch can be set only when a laser beam device is used.

A print setting control to be arranged on the print setting screen 500 is determined based on PC acquired from the print data generation software 202, and supported function information of each device type to be determined using a method to be described below. With this configuration, it is possible to display a UI screen appropriately customized in accordance with a device type, instead of displaying the same UI screen on all connected printing apparatuses 102. While the control 502 for setting a sheet type is arranged at the top in FIG. 5A, the control 503 for setting a sheet size is arranged at the top in FIG. 5B. A function to be emphasized varies between the inkjet device and the laser beam device. Because the inkjet device uses various sheet types depending on the purpose, the setting of a sheet type is considered to be important. Thus, the control 502 for setting a sheet type is arranged on the topmost line that easily comes under user's observation. In contrast, the laser beam device mainly uses plain paper mainly for the office use, and therefore the setting of a sheet type is rarely changed. Thus, the control 502 for setting a sheet type is arranged on the line lower than that of the settings of a sheet size and printing orientation. Thus, on the print setting screen 500 for the inkjet device, the settings of a sheet type, a sheet size, and printing orientation are arranged in order from above, as illustrated in FIG. 5A. In contrast, on the print setting screen 500 for the laser beam device, the settings of a sheet size, printing orientation, and a sheet type are arranged in order from above, as illustrated in FIG. 5B. In this manner, an arrangement order of a plurality of equivalent print settings varies depending on the device type, in the present exemplary embodiment.

In device type determination processing to be described below, there is a case where a device type can be determined to be other devices, which include neither the inkjet device nor the laser beam device. In this case, only minimum functions common to the both devices are considered to be displayed. Alternatively, in a case where a device type is determined to be other device, the same functions as those of either the inkjet device or the laser beam device can be displayed.

<Print Setting Screen Display Processing>

FIG. 6 is a diagram illustrating a main processing flow of print setting screen display processing to be executed by the print setting screen extension unit 205 in the present printing system. Hereinafter, the print setting screen extension unit 205 will be sometimes described as performing each piece of processing. However, in practice, a corresponding function may be implemented by the CPU 111 executing a corresponding program.

The processing flow illustrated in FIG. 6 is started by the extension application 204 receiving a print setting screen display instruction from the drawing application 201. In step S601, the print setting screen extension unit 205 acquires PC from the print data generation software 202. FIG. 8 is a diagram illustrating an example of PC 800 generated by the print data generation software 202. The PC 800 include information regarding a function (Feature) that can be used in the print data generation software 202, and information regarding a setting value (Option) of a certain function. The PC 800 illustrated in FIG. 8 indicate that sheet size (PageMediaSize), sheet type (PageMediaType), and printing orientation (PageOrientation) can be set. By referring to the PC 800, the print setting screen extension unit 205 or an application that provides a unique print setting screen can provide a print setting screen.

In step S602, the print setting screen extension unit 205 acquires device information from the printing apparatus 102. The device information is included in a response acquired by issuing a Get-Printer-Attributes operation of the IPP to the printing apparatus 102. In step S603, a device type of the associated printing apparatus 102 is determined using the device information acquired in step S602.

Figure 7:
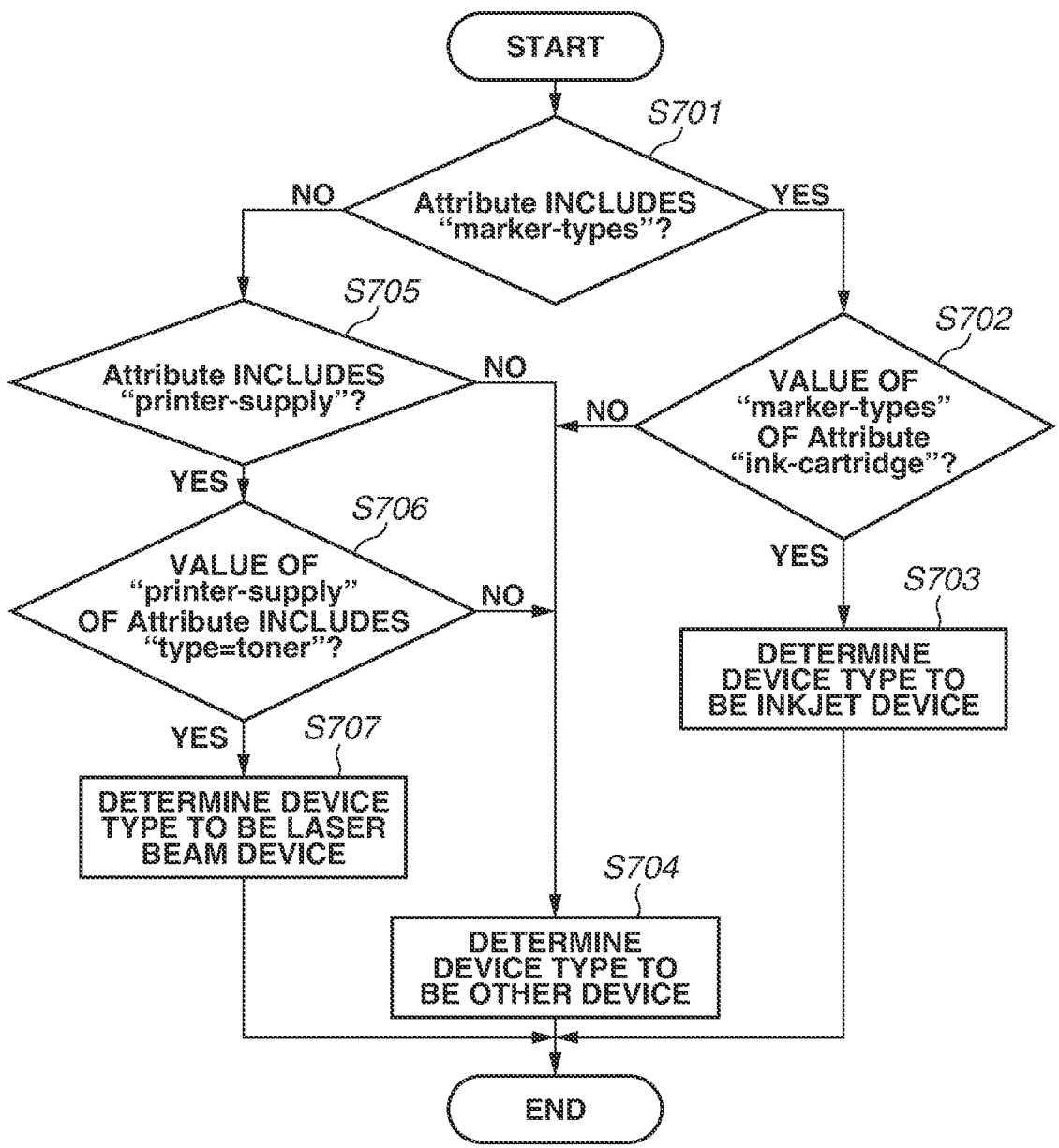
FIG. 7 is a diagram illustrating a processing flow for determining a device type of a printing apparatus.

FIG. 7 is a flowchart illustrating a detailed flow of the processing executed by the print setting screen extension unit 205 in step S603. The processing flow illustrated in FIG. 7 is on the premise that device information acquired in step S602 is information obtained from a response of the Get-Printer-Attributes operation of the IPP of the printing apparatus 102. However, the processing flow can be a processing flow of determining a device type using information obtained by another method. In step S701, the print setting screen extension unit 205 checks whether a response of the Get-Printer-Attributes operation of the IPP of the printing apparatus 102 includes a "marker-types" attribute. In a case where it is determined in step S701 that the "marker-types" attribute is included (YES in step S701), the processing proceeds to step S702. In step S702, the print setting screen extension unit 205 checks whether a "marker-types" attribute value in the response of the Get-Printer-Attributes operation of the IPP of the printing apparatus 102 is "ink-cartridge". In a case where it is determined in step S702 that the "marker-types" attribute value is "ink-cartridge" (YES in step S702), the processing proceeds to step S703. In step S703, the print setting screen extension unit 205 determines the device type of the printing apparatus 102 to be an inkjet device.

In a case where it is determined in step S701 that the "marker-types" attribute is not included (NO in step S701), the processing proceeds to step S705. In step S705, the print setting screen extension unit 205 checks whether a response of the Get-Printer-Attributes operation of the printing apparatus 102 includes a "printer-supply" attribute. In a case where it is determined in step S705 that the "printer-supply" attribute is included (YES in step S705), the processing proceeds to step S706. In step S706, the print setting screen extension unit 205 checks whether a "printer-supply" attribute value in the response of the Get-Printer-Attributes operation of the IPP of the printing apparatus 102 includes "type=toner". In a case where it is determined in step S706 that the "printer-supply" attribute value includes "type=toner" (YES in step S706), the processing proceeds to step S707. In step S707, the print setting screen extension unit 205 determines the device type of the printing apparatus 102 to be a laser beam device. In a case where it is determined in step S702 that the "marker-types" attribute value is not "ink-cartridge" (NO in step S702), in a case where it is determined in step S705 that the "printer-supply" attribute is not included (NO in step S705), or in a case where it is determined in step S706 that the "printer-supply" attribute value does not include "type=toner" (NO in step S706), the processing proceeds to step S704. In step S704, the print setting screen extension unit 205 determines that the device type of the printing apparatus 102 to be other device.

In FIG. 7, the print setting screen extension unit 205 determines a device type based on information obtained from the response of the Get-Printer-Attributes operation of the IPP of the printing apparatus 102, but can determine a device type based on another type of information. For example, the print setting screen extension unit 205 can determine a device type based on information acquired from the printing apparatus 102 using another method. Alternatively, the print setting screen extension unit 205 can determine a device type based on information such as the name of the printing apparatus 102 that has been acquired from the printing apparatus 102, and table information included in the extension application 204. The table information can be acquired from a server (not illustrated).

The description will return to the flow illustrated in FIG. 6. In step S604, the print setting screen extension unit 205 acquires supported function information 1401 corresponding to the device type. FIG. 14 is a diagram illustrating an example of the supported function information 1401 to be acquired in step S604. In the supported function information 1401, functions to be displayed by the print setting screen extension unit 205 on a print setting screen, and information regarding a display order are described for each device type. The supported function information 1401 is considered to be prestored in the extension application 204, but the supported function information 1401 stored in an external server can also be acquired.

The processing in steps S605 and S606 is processing to be repeatedly performed by the print setting screen extension unit 205 for each of the functions described in the supported function information 1401 acquired in step S604. For example, in a case where the device type is determined to be an inkjet device in step S603, the print setting screen extension unit 205 repeatedly executes the processing in steps S605 and S606 for a sheet type, a sheet size, printing orientation, a sheet tray, reverse order printing, borderless printing, and two-sided printing. In step S605, the print setting screen extension unit 205 checks whether a supported function is included in PC. The PC are generated based on the PDC generated by the IPP Class Driver acquiring capability information from the printing apparatus 102. That is, a function described in the PC is a function that can be set by the IPP Class Driver. The print setting screen extension unit 205 checks functions to be displayed in the supported function information 1401, and checks whether the connected printing apparatus 102 supports the functions, based on the PC.

In a case where it is determined in step S605 that a supported function is included in PC (YES in step S605), the processing proceeds to step S606. In step S606, the print setting screen extension unit 205 adds a control for setting the function, to the print setting screen 500. In a case where it is determined in step S605 that a supported function is not included in PC (NO in step S605), the print setting screen extension unit 205 determines that the printing apparatus 102 does not support the function, and does not add a control for setting the function, to the print setting screen 500. By repeating the processing in steps S605 and S606 the number of times corresponding to the number of target functions, the print setting screen extension unit 205 displays the print setting screen 500 adapted to the capability and the device type of the connected device.

A function not included in the supported function information 1401 is a function that does not need to be set by the user, or a function not recognized at the development time point of the extension application 204. By avoiding displaying, on the print setting screen 500, a function that does not need to be set by the user, the print setting screen 500 can be simplified, and the user can easily pay attention to an important print setting. Thus, even if information indicating the function is included in PC, the function is not displayed on the print setting screen 500 so as not for the user to set the function. As to a function having not been recognized at the development time point of the extension application 204, influence to be exerted by setting is unknown. Thus, even if information indicating the function is included in PC, the function is not displayed on the print setting screen 500 in such a manner as to prevent the user from setting the function.

Example of Screen to Be Displayed by Notification Unit

Figure 9A:
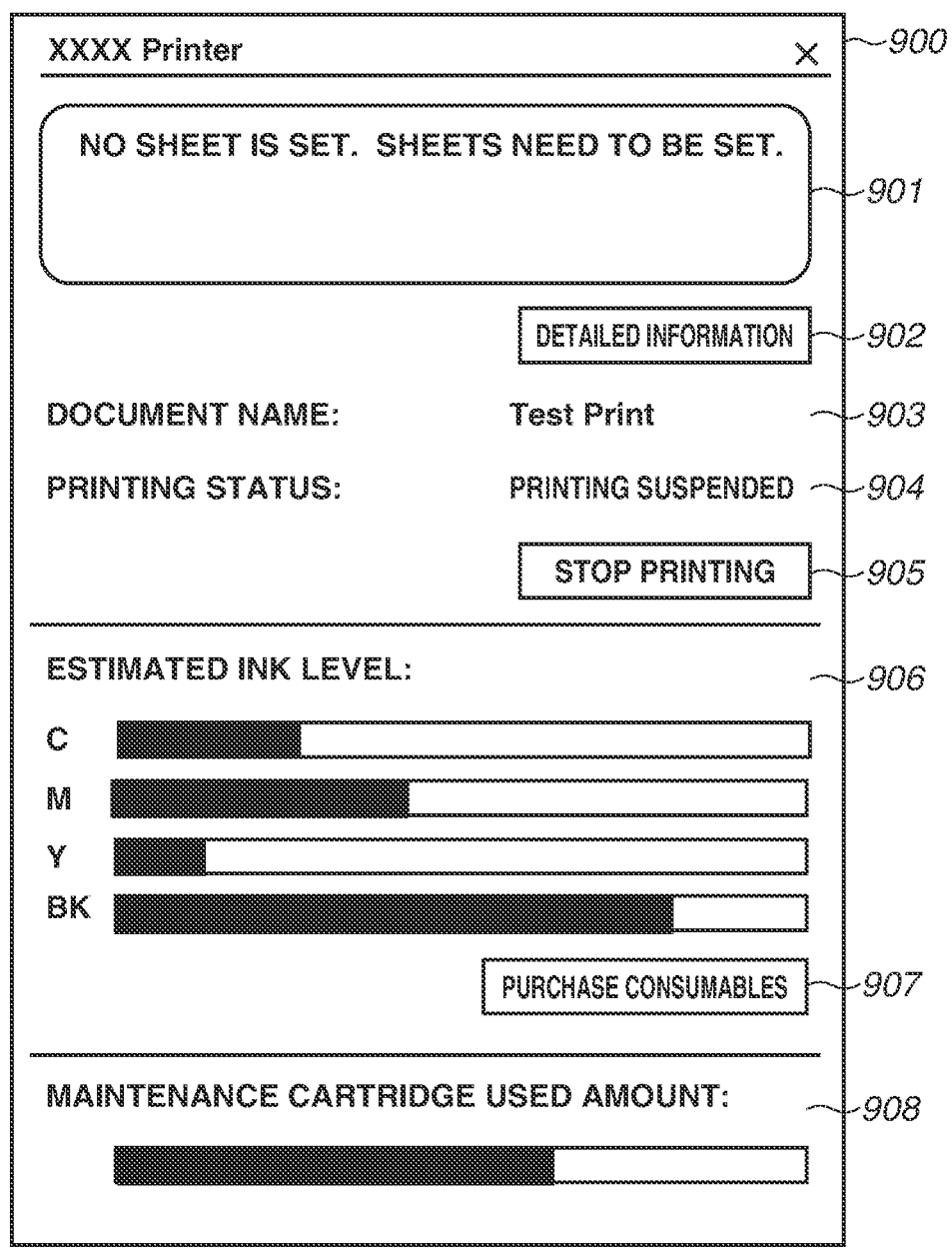
FIGS. 9A and 9B are diagrams each illustrating an example of a status notification screen to be displayed by a notification unit.
Figure 9B:
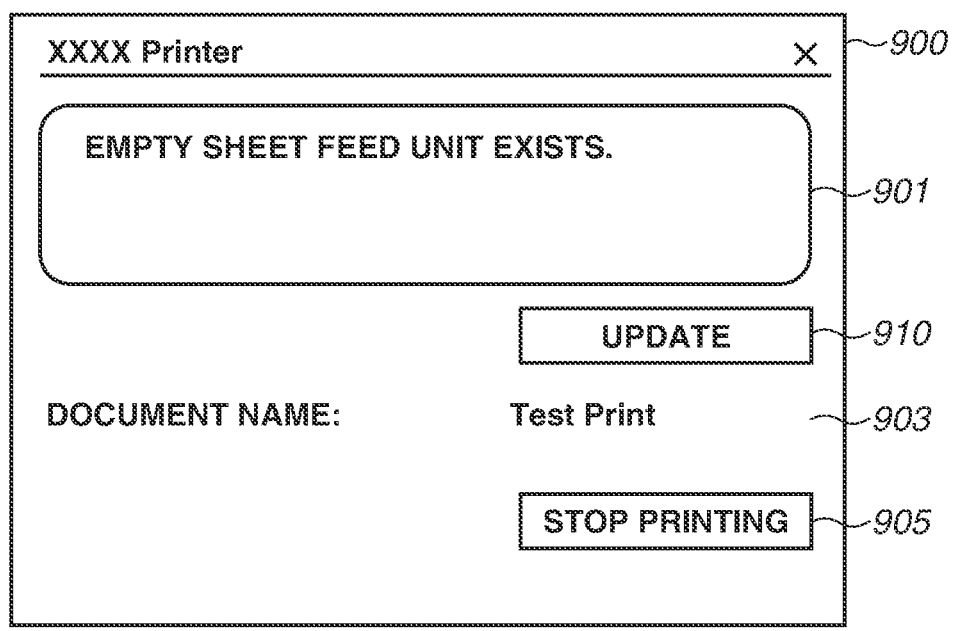

A status notification screen to be displayed by the notification unit 209 will now be described with reference to FIGS. 9A and 9B. A status notification screen 900 illustrated in FIGS. 9A and 9B is an example of a screen to be displayed by the notification unit 209 based on information acquired from the printing apparatus 102. The notification unit 209 is invoked from the OS by the press of a toast notification displayed by the OS upon the printing apparatus 102 entering an error state.

The status notification screen 900 illustrated in FIG. 9A is an example of a screen to be displayed by the notification unit 209 in a case where an inkjet device is associated as the printing apparatus 102. A display region 901 is a display region for displaying a message suitable for device information acquired from the printing apparatus 102. In FIGS. 9A and 9B, a message to be displayed in a case where the printing apparatus 102 is in a paper empty error state is displayed in the display region 901. A control 902 is a remote UI activation button. If the control 902 is pressed, a remote UI functioning as the printing apparatus 102 that is provided by the associated printing apparatus 102 is displayed. The remote UI is considered to be displayed by activating a browser, but the remote UI can be displayed within the status notification screen 900. With such a configuration, the user can browse and manage device information or consumables information of the printing apparatus 102 via the remote UI.

In display regions 903 and 904, information regarding a corresponding print job is displayed. In a case where an error occurs in the printing apparatus 102 during the processing of a print job being processed in the print data generation software 202, the OS displays a toast notification. The toast notification that triggers the activation of the status notification screen 900 is associated with a specific print job. The notification unit 209 displays information regarding a print job associated with a toast notification that has triggered the activation of the status notification screen 900, and issues a printing stop instruction.

The display region 903 displays a document name of the print job. The display region 904 displays the status of the print job. Examples of statuses of the print job to be displayed in the display region 904 include status information, such as "printing suspended" to be displayed in a case where the printing apparatus 102 is in the error state, and "now printing" to be displayed in a case where an error is resolved and printing is restarted. A control 905 is a print job cancel button. If the control 905 is pressed, the print job is canceled and printing is stopped. A display region 906 is a display region for displaying an ink remaining amount. The notification unit 209 acquires device information from the printing apparatus 102, and displays an ink remaining amount as a bar chart based on ink remaining amount information included in the device information. A control 907 is a consumables purchase button. If the control 907 is pressed, a purchase site of consumables such as ink is displayed. A consumables purchase site is considered to be displayed by activating a browser, but the consumables purchase site can be displayed within the status notification screen 900. A display region 908 is a region for displaying a used amount of a maintenance cartridge. The notification unit 209 acquires device information from the printing apparatus 102, and displays an ink remaining amount based on maintenance cartridge capacity information included in the device information.

The status notification screen 900 illustrated in FIG. 9B is an example of a screen to be displayed by the notification unit 209 in a case where a laser beam device is associated as the printing apparatus 102. The status notification screen 900 illustrated in FIG. 9B will be described assuming that the UP Class Driver is used as the print data generation software 202. The display regions 901 and 903 and the control 905 are the same as those illustrated in FIG. 9A, and thus the description will be omitted. A control 910 is an update button. If the control 910 is pressed, device information and job information are reacquired from the printing apparatus 102, and the display is updated in accordance with the acquired information.

In a case where an update button is not displayed, the notification unit 209 performs information reacquisition and display update at regular intervals. The update button is used to manually perform display update in cloud print in which a communication volume consumed by polling is desired to be reduced because the communication volume is directly linked to cost.

In this manner, the notification unit 209 can provide the user with a status notification adapted to the connected printing apparatus 102, by performing not only status notification that is based on device information acquired from the printing apparatus 102, but also the change of a screen configuration in accordance with a device type or the print data generation software 202 being used.

<Display Processing by NOTIFICATION UNIT>

Figure 10:
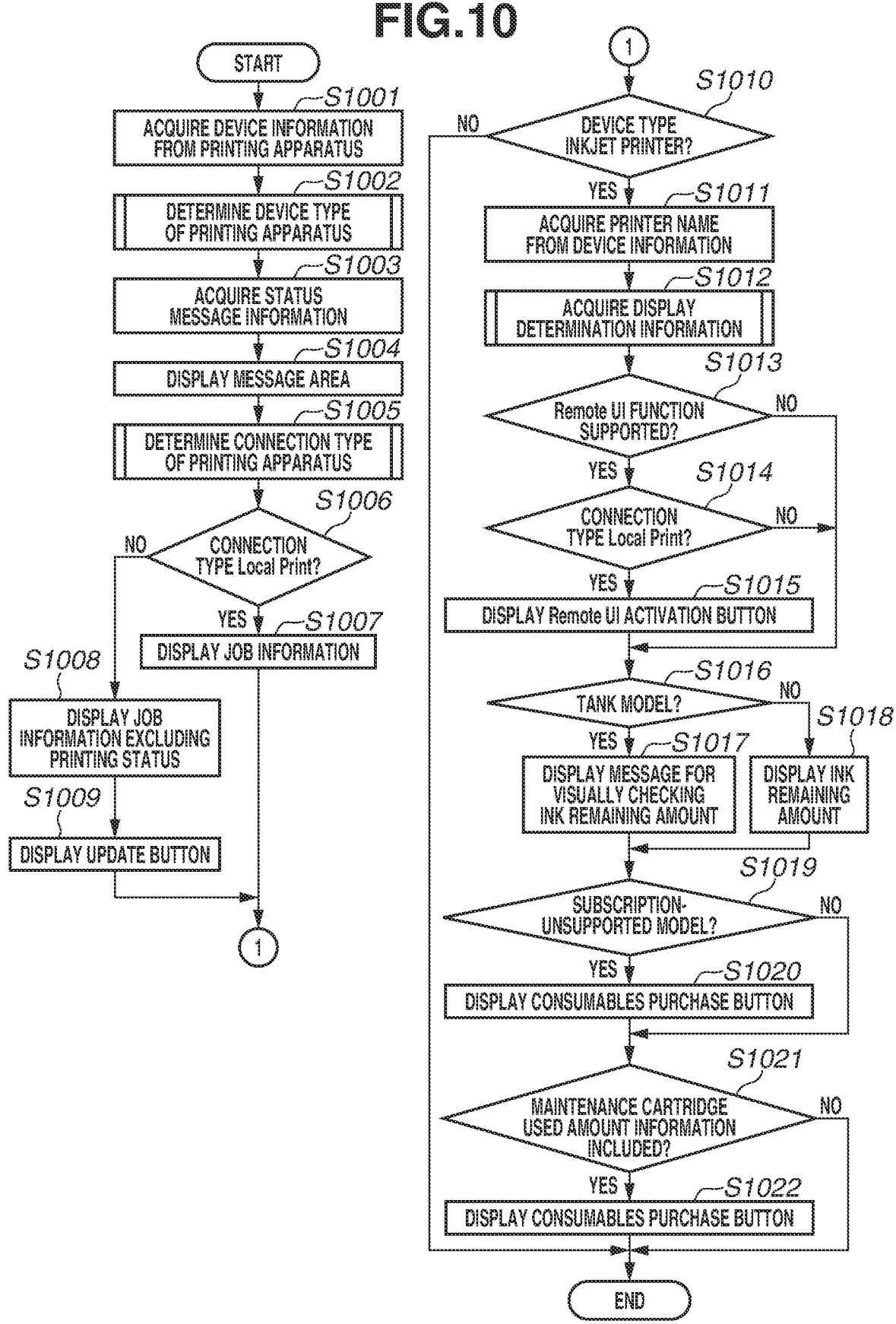
FIG. 10 is a diagram illustrating a processing flow for displaying a status notification screen with the notification unit.

FIG. 10 is a diagram illustrating a main processing flow of status notification screen display processing to be executed by the notification unit 209 in this printing system. Hereinafter, the notification unit 209 will sometimes be described as performing each piece of processing. However, in practice, a corresponding function may be implemented by the CPU 111 executing a corresponding program.

The processing flow illustrated in FIG. 10 is started by the extension application 204 receiving a status notification screen display instruction from the OS via a toast notification. In step S1001, the notification unit 209 acquires device information from the printing apparatus 102. The device information is included in a response acquired by issuing a Get-Printer-Attributes operation of the IPP to the printing apparatus 102. In step S1002, the notification unit 209 determines the device type of the associated printing apparatus 102 using the device information acquired in step S1001.

The processing in step S1002 is the same as the processing in FIG. 7 and the description will be omitted, however, an actor of the processing is the notification unit 209. In a case where the print setting screen extension unit 205 preliminarily determines the device type, it is considered that the processing in FIG. 7 is skipped by storing the device information into the shared information 210 and acquiring the information. In step S1003, the notification unit 209 acquires status message information. The status message information is considered to be prestored in the extension application 204, but status message information stored in an external server can be acquired. FIG. 15 is a diagram illustrating an example of status message information. In status message information 1501, information is described regarding messages to be displayed in a case where the associated printing apparatus 102 is an inkjet device, and in a case where the associated printing apparatus 102 is a laser beam device. For example, in a case where status information acquired from the printing apparatus 102 indicates a printing status, the notification unit 209 displays the same message irrespective of the device type.

In contrast, in a case where status information acquired from the printing apparatus 102 indicates a paper empty error, a message varying depending on the device type is displayed. For example, a message indicating "No sheet is set. A sheet needs to be set." is displayed in the case of the inkjet device. In contrast, a message indicating "An empty sheet feed unit exists." is displayed in the case of the laser beam device, because many products include a plurality of sheet feed units. In a case where status information indicates ink empty, only the inkjet device displays a message corresponding to the status. In a case where status information indicates toner empty, only the laser beam device displays a message corresponding to the status. Not only when status information indicates ink empty (out of ink) or toner empty (out of toner), but also when status information indicates a low remaining amount, such as ink low and toner low, a message corresponding to the status can be displayed. In this manner, a message to be displayed by the notification unit 209 sometimes varies depending on the device type of the connected printing apparatus 102. In step S1004, the notification unit 209 displays an appropriate message based on the device type determined in step S1002 and the status message information 1501 acquired in step S1003. In the present exemplary embodiment, the notification unit 209 switches a message depending on the device type, but can switch a message depending on another type of information. For example, the notification unit 209 can determine a connection type of the printing apparatus 102, and switch a message depending on whether the connection type is Local Print or Universal Print.

Figure 11:
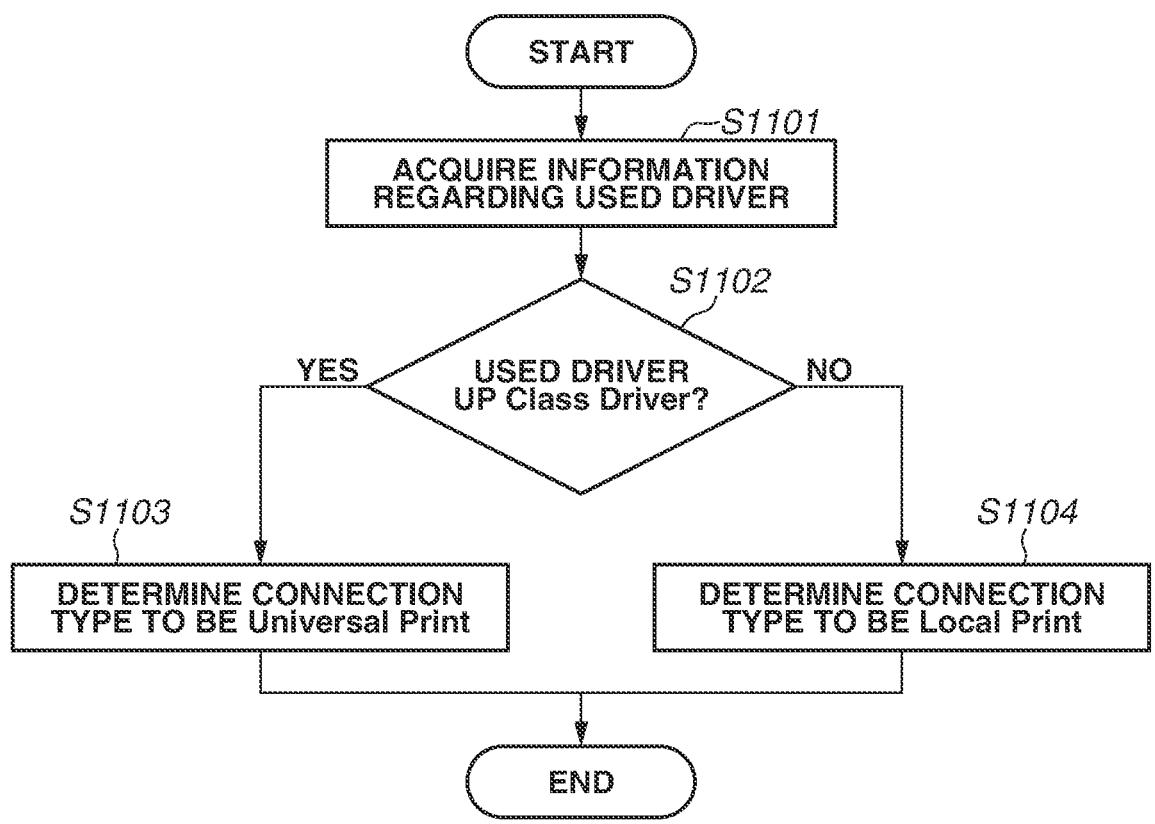
FIG. 11 is a diagram illustrating a processing flow for determining a connection type of the printing apparatus.

In step S1005, the notification unit 209 determines the connection type of the associated printing apparatus 102. FIG. 11 is a flowchart illustrating a detailed flow of the processing executed by the notification unit 209 in step S1005. In step S1101, the notification unit 209 acquires information regarding the print data generation software 202 being used in the associated printing apparatus 102. As the print data generation software 202 that can be extended by the extension application 204, there are two types corresponding to the IPP Class Driver and the UP Class Driver. That is, the printing apparatus 102 associated with the extension application 204 uses either the IPP Class Driver or the UP Class Driver. Thus, in step S1102, the notification unit 209 checks whether a driver being used is the UP Class Driver. In a case where it is determined in step S1102 that a driver being used is the UP Class Driver (YES in step S1102), the processing proceeds to step S1103. In step S1103, the notification unit 209 determines the connection type of the printing apparatus 102 to be Universal Print. In a case where it is determined in step S1102 that a driver being used is not the UP Class Driver (NO in step S1102), the processing proceeds to step S1104. In step S1104, the notification unit 209 determines the connection type of the printing apparatus 102 to be Local Print.

The description will return to the flow illustrated in FIG. 10. In step S1006, the notification unit 209 checks whether the connection type is Local Print. In a case where it is determined in step S1006 that the connection type is Local Print (YES in step S1006), the processing proceeds to step S1007. In step S1007, the notification unit 209 displays the display regions 903, 904 indicating print job information and the control 905 serving as the print job cancel button.

The processing in steps S1008 and S1009 is processing to be executed in a case where the connection type is determined to be Universal Print. In a case where it is determined in step S1006 that the connection type is not Local Print (NO in step S1006), the processing proceeds to step S1008. In step S1008, the notification unit 209 displays the display region 903 indicating print job information, and the control 905 for issuing a print job cancel instruction, on the status notification screen 900, and does not display the display region 904 indicating print job status information. The reason why the display region 904 is not displayed is that, in a case where status information is acquired via a server, it is considered the status information cannot be accurately synchronized with the state of the printing apparatus 102. In step S1009, the notification unit 209 displays the control 910 for issuing a display update instruction, on the status notification screen 900.

In the present exemplary embodiment, it is assumed to display a remote UI activation button, an ink remaining amount, an ink purchase button, and a maintenance cartridge used amount, only when an inkjet device is used. Thus, in step S1010, the notification unit 209 checks whether the device type determined in step S1002 is the inkjet printer. In a case where it is determined in step S1010 that the device type is the inkjet printer (YES in step S1010), the processing proceeds to step S1011. By executing the processing in steps S1011 to S1022, the notification unit 209 displays a remote UI activation button, an ink remaining amount, an ink purchase button, and a maintenance cartridge used amount.

Figure 13:
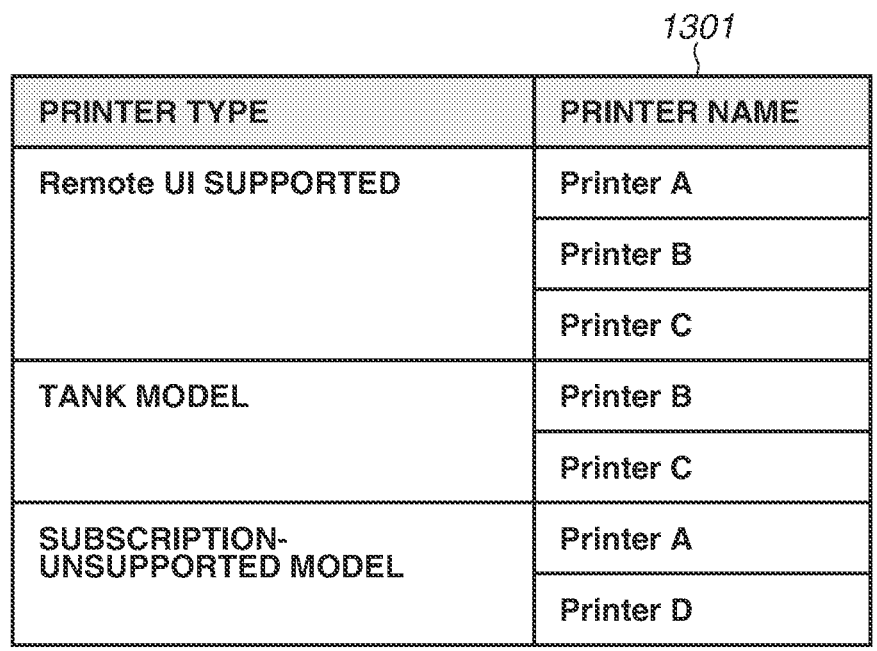
FIG. 13 is a diagram illustrating an example of display determination information.

In step S1011, the notification unit 209 acquires information regarding a printer name from the device information acquired in step S1001. In step S1012, the notification unit 209 acquires display determination information. FIG. 13 is a diagram illustrating an example of display determination information 1301. In the display determination information 1301 exemplified in FIG. 13, information indicating whether a remote UI function is supported, information indicating whether a model is a tank model and information indicating whether a model is a subscription-unsupported model are described in association with printer information. The notification unit 209 determines items to be displayed on the status notification screen 900, based on the display determination information 1301 and a printer name of the connected printing apparatus 102.

Figure 12:
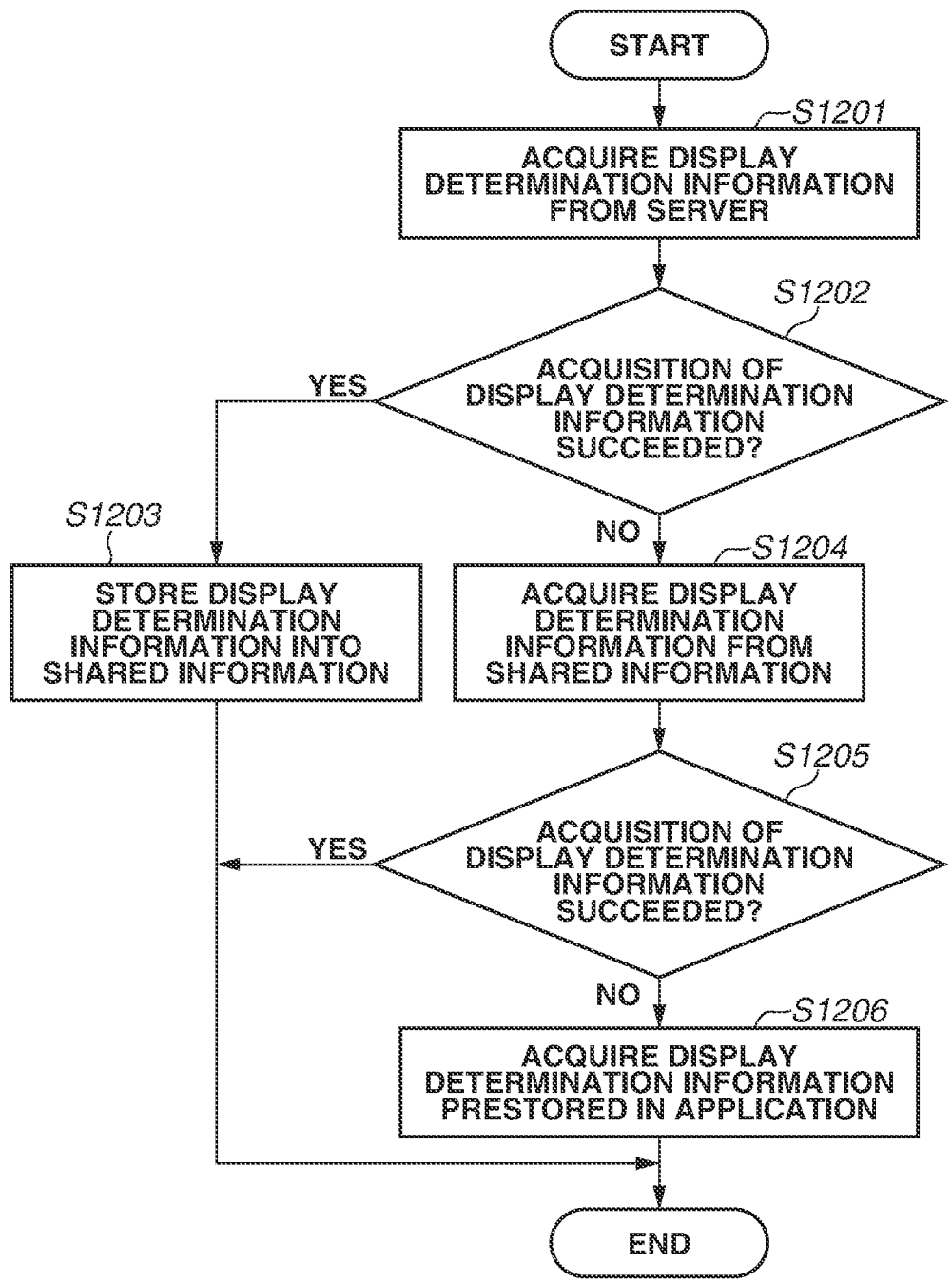
FIG. 12 is a diagram illustrating a processing flow for acquiring display determination information.

FIG. 12 is a flowchart illustrating a detailed flow of the processing executed by the notification unit 209 in step S1012. In step S1201, the notification unit 209 acquires the display determination information 1301 from a server. By employing a configuration of acquiring the display determination information 1301 from a server, the notification unit 209 can acquire latest information without releasing the updated extension application 204. In step S1202, the notification unit 209 checks whether the acquisition of the display determination information 1301 has succeeded in step S1201.

In a case where it is determined in step S1202 that the acquisition of the display determination information 1301 has succeeded (YES in step S1202), the notification unit 209 uses the display determination information 1301 acquired in step S1201, in the processing in step S1013 and subsequent steps of FIG. 10. In step S1203, the notification unit 209 stores the display determination information 1301 into the shared information 210. With this configuration, the notification unit 209 can use latest information among pieces of information acquired so far, even in a case where the display determination information 1301 fails to be acquired from a server at the time of next activation or later. In a case where it is determined in step S1202 that the acquisition of the display determination information 1301 has failed (NO in step S1202), the processing proceeds to step S1204. In step S1204, the notification unit 209 acquires the display determination information 1301 from the shared information 210. In step S1205, the notification unit 209 checks whether the acquisition of the display determination information 1301 has succeeded in step S1204. In a case where it is determined in step S1205 that the acquisition of the display determination information 1301 has succeeded (YES in step S1205), the notification unit 209 uses the display determination information 1301 acquired in step S1204, in the processing in step S1013 and subsequent steps of FIG. 10. In a case where it is determined in step S1205 that the acquisition of the display determination information 1301 has failed (NO in step S1205), the processing proceeds to step S1206. In step S1206, the notification unit 209 acquires the display determination information 1301 prestored in the extension application 204, and uses the acquired display determination information 1301 in the processing in step S1013 and subsequent steps of FIG. 10.

The description will return to the processing flow illustrated in FIG. 10. The processing in steps S1013 to S1015 is processing for displaying the control 902 being a remote UI activation button, on the status notification screen 900.

In step S1013, the notification unit 209 checks whether a connected printer supports a remote UI function, based on a printer name and the display determination information 1301. In a case where it is determined in step S1013 that a connected printer supports a remote UI function (YES in step S1013), the processing proceeds to step S1014. In step S1014, the notification unit 209 checks whether the connection type is Local Print, based on the information determined in step S1005. In a case where the connection type is Universal Print, the printing apparatus 102 is connected via a server, and thus a remote UI cannot be displayed. In a case where it is determined in step S1014 that the connection type is Local Print (YES in step S1014), the processing proceeds to step S1015. In step S1015, the notification unit 209 displays the control 902 being a remote UI activation button, on the status notification screen 900. In a case where it is determined in step S1013 that a connected printer does not support a remote UI function (NO in step S1013), or in a case where it is determined in step S1014 that the connection type is not Local Print (NO in step S1014), the control 902 being a remote UI activation button is not displayed on the status notification screen 900.

The processing in steps S1016 to S1018 is processing for switching the display content of an ink remaining amount. In step S1016, the notification unit 209 checks whether a connected printer is a tank model, based on a printer name and the display determination information 1301. The tank model is used by the user injecting ink into a tank included in the printing apparatus 102, and therefore a discrepancy sometimes arises between an actual ink remaining amount and ink remaining amount information recognized by the printing apparatus 102. Thus, the tank model does not perform remaining amount display that is based on ink remaining amount information acquired from the printing apparatus 102. Instead, the tank model displays a message for prompting the user to visually check an ink remaining amount. In a case where it is determined in step S1016 that a connected printer is a tank model (YES in step S1016), the processing proceeds to step S1017. In step S1017, the notification unit 209 displays a message for prompting the user to visually check an ink remaining amount, in the display region 906 for displaying an ink remaining amount. In a case where it is determined in step S1016 that a connected printer is not a tank model (NO in step S1016), the processing proceeds to step S1018. In step S1018, the notification unit 209 displays ink remaining amount information in the display region 906 based on the device information acquired in step S1001. In this manner, in a case where the connected printer is not a tank model but a cartridge type in which an ink cartridge is attached to a carriage of a printing apparatus 102, an ink remaining amount is displayed. As a printing apparatus 102 of the cartridge type, a device including a disposal type recording head, in which an ink tank and a recording head are integrated, or a printing apparatus including a permanent type recording head, in which an ink tank and a recording head are separated, can be used.

The processing in steps S1019 and S1020 is processing for displaying the consumables purchase button 907 on the status notification screen 900. In step S1019, the notification unit 209 checks whether the connected printing apparatus 102 is a subscription-unsupported model, based on a printer name and the display determination information 1301. In a subscription-supported device, ink is supplied from a printer vendor in accordance with a contract, and the user needs not purchase ink by himself/herself. The displays of the consumables purchase button 907 therefore becomes unnecessary. In a case where it is determined in step S1019 that the connected printing apparatus 102 is a subscription-unsupported model (YES in step S1019), the processing proceeds to step S1020. In step S1020, the notification unit 209 displays the control 907 being a consumables purchase button, on the status notification screen 900. In a case where it is determined in step S1019 that the connected printing apparatus 102 is not a subscription-unsupported model (NO in step S1019), the notification unit 209 does not display the control 907 being a consumables purchase button, on the status notification screen 900. Even in a case where it is determined in step S1019 that the connected printing apparatus 102 is a subscription-supported model, it can be further determined whether a predetermined subscription contract has been concluded, and in a case where the predetermined subscription contract has not been concluded, the control 907 being a consumables purchase button can be displayed.

The processing in steps S1021 and S1022 is processing for displaying the display region 908 for displaying a maintenance cartridge used amount, on the status notification screen 900. In step S1021, the notification unit 209 checks whether the device information acquired in step S1001 includes maintenance cartridge used amount information. In a case where the printing apparatus 102 is not adapted to the replacement of a maintenance cartridge, a maintenance cartridge used amount is not displayed, because the device information does not include maintenance cartridge used amount information. In a case where it is determined in step S1021 that maintenance cartridge used amount information is included (YES in step S1021), the processing proceeds to step S1022. In step S1022, the notification unit 209 displays the display region 908 for displaying a maintenance cartridge used amount. In a case where it is determined in step S1021 that maintenance cartridge used amount information is not included (NO in step S1021), the notification unit 209 does not display the display region 908.

In a case where it is determined in step S1010 that the device type is not the inkjet printer (NO in step S1010), the processing in steps S1011 to S1022 is skipped, and the display is not performed of the remote UI activation button, the ink remaining amount, and the ink purchase button. Through the above-described processing, an appropriate status notification screen 900 suitable for the device type and the connection type of the connected printing apparatus 102, and the capability of each printer can be provided.

In general, laser beam devices are used in a shared state and an error may be referred to on a main body side, and therefore the status notification screen 900 is only required to display minimum information that can cause the user to notice an error state. In contrast to this, some inkjet devices do not include a display panel on their main body, and thus information that can be displayed on a printing apparatus main body is limited. Thus, information display on the host computer 101 side is important.

In this manner, according to the present exemplary embodiment, it becomes possible to display an appropriate UI screen suitable for the connected printing apparatus 102 with one extension application 204. More specifically, the extension application 204 according to the present exemplary embodiment varies a print setting screen and a status notification screen depending on the type of the printing apparatus 102. With this configuration, in the present exemplary embodiment, it becomes possible to display an appropriate UI screen suitable for the type of the printing apparatus 102.

In the present exemplary embodiment, when the type of the printing apparatus 102 is an inkjet device, a display method of an ink remaining amount is varied depending on whether the printing apparatus 102 is a tank type (first type) or a cartridge type (second type). Specifically, in a case where the printing apparatus 102 is the tank type, an ink remaining amount is not displayed. In a case where the printing apparatus 102 is not the tank type (i.e., cartridge type), an ink remaining amount is displayed. In the present exemplary embodiment, in a case where the printing apparatus 102 is the tank type, an ink remaining amount is not displayed, but a message is displayed instead. Furthermore, in the present exemplary embodiment, in a case where the printing apparatus 102 is not a model supporting subscription as a predetermined service, an item (consumables purchase button) for connecting to a consumables purchase site is displayed. In this manner, in the present exemplary embodiment, an appropriate UI screen suitable for the type of the inkjet-type printing apparatus can be displayed if the printing apparatus 102 is an inkjet device (inkjet-type printing apparatus).

In the present exemplary embodiment, the display of a UI screen is varied depending on whether a connection type is Universal Print or Local Print. More specifically, display and nondisplay of an item (remote UI activation button) for activating a remote UI are switched depending on whether a printing mode is a printing mode (first printing mode) that uses the IPP Class Driver, or a printing mode (second printing mode) that uses the UP Class Driver. With this configuration, in the present exemplary embodiment, it becomes possible to display an appropriate UI screen in accordance with a printing mode.

In the above description, the inkjet device has been described as the first model and the laser beam device has been described as the second model, but models in the present exemplary embodiment are not limited to this combination. For example, the second model is not limited to the laser beam device, and the second model can be widely applied to an electrophotographic device, such as a light-emitting diode (LED) printer device.

Needless to say, the object of the present invention is achieved also by supplying a storage medium storing a program code of software for implementing the function of the above-described exemplary embodiment, to a system or an apparatus, and a computer (or a CPU or a micro processing unit (MPU)) of the system or the apparatus reading out and executing the program code stored in the storage medium. In this case, the program code read out from the storage medium implements the function of the above-described exemplary embodiment, and the storage medium storing the program code constitutes the embodiments of the present invention.

As a storage medium for supplying the program code, for example, a flexible disk, a hard disk, an optical disk, a magnetooptical disk, a compact disk read only memory (CD-ROM), a CD recordable (CD-R), a magnetic tape, a nonvolatile memory card, a ROM, or a digital versatile disk (DVD) can be used.

Needless to say, not only a case where the function of the above-described exemplary embodiment is implemented by a computer executing a read program code, but also a case where an OS operating on the computer performs a part or all of actual processing based on an instruction of the program code, and the function of the above-described exemplary embodiment is implemented by the processing is included.

Furthermore, needless to say, a case is also included where a program code read out from a storage medium is written into a memory included in a function extension board inserted into a computer or a function extension unit connected to a computer, and then, a CPU included in the function extension board or the function extension unit performs a part or all of actual processing based on an instruction of the program code, and the function of the above-described exemplary embodiment is implemented by the processing.

The disclosure of the present exemplary embodiment includes a configuration, a method, and a program, which will be described below.

(Configuration 1)
An information processing apparatus including an application configured to perform extension of a function provided by print data generation software configured to be used in common by a plurality of different printing apparatuses, the information processing apparatus comprising:
    an acquisition unit configured to acquire information regarding a type of a printing apparatus connected to the information processing apparatus; and
    a display unit configured to display a screen with a configuration customized in accordance with the type of the printing apparatus that has been acquired by the acquisition unit.

(Configuration 2)
The information processing apparatus according to configuration 1, wherein the display unit is configured to vary a print setting screen for setting printing in accordance with the type of the printing apparatus that has been acquired by the acquisition unit.

(Configuration 3)
The information processing apparatus according to configuration 2, wherein the display unit is configured to vary a name to be displayed as an equivalent function in accordance with the type of the printing apparatus that has been acquired by the acquisition unit.

(Configuration 4)
The information processing apparatus according to configuration 2 or 3, wherein the display unit is configured to vary a function to be displayed on the print setting screen in accordance with the type of the printing apparatus that has been acquired by the acquisition unit.

(Configuration 5)
The information processing apparatus according to any one of configurations 2 to 4, wherein the display unit is configured to vary a name to be displayed as an equivalent function on the print setting screen in accordance with the type of the printing apparatus that has been acquired by the acquisition unit.

(Configuration 6)
The information processing apparatus according to any one of configurations 2 to 5, wherein the display unit is configured to vary an arrangement order of a plurality of equivalent functions on the print setting screen in accordance with the type of the printing apparatus that has been acquired by the acquisition unit.

(Configuration 7)
The information processing apparatus according to any one of configurations 1 to 6, wherein the display unit is configured to vary a status notification screen for making a status notification of the printing apparatus in accordance with the type of the printing apparatus that has been acquired by the acquisition unit.

(Configuration 8)
The information processing apparatus according to configuration 7, wherein the display unit is configured to vary a message to be displayed in a case where a sheet for performing printing in the printing apparatus is not set in accordance with the type of the printing apparatus that has been acquired by the acquisition unit.

(Configuration 9)
The information processing apparatus according to any one of configurations 1 to 8, wherein the display unit is configured to display, as an activation screen to be displayed in a case where the application is activated, a common screen irrespective of the type of the printing apparatus.

(Configuration 10)
The information processing apparatus according to configuration 9, wherein the display unit is configured to display, on the activation screen, an item for displaying a screen for obtaining acceptance of a usage survey of the printing apparatus from a user.

(Method 1)
An information processing method in an information processing apparatus including an application configured to perform extension of a function provided by print data generation software configured to be used in common by a plurality of different printing apparatuses, the information processing method comprising:
    acquiring information regarding a type of a printing apparatus connected to the information processing apparatus; and
    displaying a screen with a configuration customized in accordance with the type of the printing apparatus that has been acquired in the acquiring.

(Method 2)
The information processing method according to method 1, wherein a print setting screen for setting printing is varied in the displaying in accordance with the type of the printing apparatus that has been acquired.

(Method 3)
The information processing method according to method 2, wherein a name to be displayed as an equivalent function is varied in the displaying in accordance with the type of the printing apparatus that has been acquired.

(Method 4)
The information processing method according to method 2 or 3, wherein a function to be displayed on the print setting screen is varied in the displaying in accordance with the type of the printing apparatus that has been acquired.

(Method 5)
The information processing method according to any one of methods 2 to 4, wherein a name to be displayed as an equivalent function on the print setting screen is varied in the displaying in accordance with the type of the printing apparatus that has been acquired.

(Method 6)
The information processing method according to any one of methods 2 to 5, wherein an arrangement order of a plurality of equivalent functions on the print setting screen is varied in the displaying in accordance with the type of the printing apparatus that has been acquired.

(Method 7)
The information processing method according to any one of methods 1 to 6, wherein a status notification screen for making a status notification of the printing apparatus is varied in the displaying in accordance with the type of the printing apparatus that has been acquired.

(Method 8)
The information processing method according to method 7, wherein a message to be displayed in a case where a sheet for performing printing in the printing apparatus is not set is varied in the displaying in accordance with the type of the printing apparatus that has been acquired.

(Method 9)
The information processing method according to any one of methods 1 to 8, wherein, as an activation screen to be displayed in a case where the application is activated, a common screen is displayed in the displaying irrespective of the type of the printing apparatus.

(Method 10)
The information processing method according to method 9, wherein, on the activation screen, an item for displaying a screen for obtaining acceptance of a usage survey of the printing apparatus from a user is displayed in the displaying.

(Program 1)

A computer program for causing a computer to function as each unit of the information processing apparatus according to any one of configurations 1 to 10.

According to the present exemplary embodiment, it becomes possible to provide an appropriate UI as an extension application that extends the function of a standard driver.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2022-121179, filed Jul. 29, 2022, which is hereby incorporated by reference herein in its entirety.

What is claimed is:

1. An information processing apparatus including an application configured to support print data generation software configured to be used in common by a plurality of different printing apparatuses, the information processing apparatus comprising:
at least one processor operating to:
acquire information regarding a printing method of a printing apparatus connected to the information processing apparatus,
in a case where the information indicates that the printing method is inkjet printing, cause a display of the information processing apparatus to display a first screen with a control item for borderless printing, and
in a case where the information indicates that the printing method is electrophotographic printing, cause the display to display a second screen with a second control item for printing with expanded area.

2. The information processing apparatus according to claim 1, wherein each of the first screen and the second screen is a print setting screen for setting printing, and wherein a configuration of the print setting screen is varied in accordance with the printing method of the printing apparatus.

3. The information processing apparatus according to claim 2, wherein a function to be displayed on the print setting screen is varied in accordance with the printing method of the printing apparatus.

4. The information processing apparatus according to claim 2, wherein an arrangement order of a plurality of equivalent functions on the print setting screen is varied in accordance with the printing method of the printing apparatus.

5. The information processing apparatus according to claim 1, wherein the at least one processor further operates to cause the display to display a status notification screen for making a status notification of the printing apparatus, and wherein the status notification screen is varied in accordance with the printing method of the printing apparatus.

6. The information processing apparatus according to claim 5, wherein a message to be displayed on the status notification screen in a case where a sheet for performing printing in the printing apparatus is not set is varied in accordance with the printing method of the printing apparatus.

7. The information processing apparatus according to claim 1, wherein, as an activation screen to be displayed in a case where the application is activated, a common screen is displayed irrespective of the printing method of the printing apparatus.

8. The information processing apparatus according to claim 7, wherein an item for displaying a screen for obtaining acceptance of a usage survey of the printing apparatus from a user is displayed on the activation screen.

9. An information processing method in an information processing apparatus including an application configured to support print data generation software configured to be used in common by a plurality of different printing apparatuses, the information processing method comprising:
acquiring information regarding a printing method of a printing apparatus connected to the information processing apparatus;
in a case where the information indicates that the printing method is inkjet printing, causing a display of the information processing apparatus to display a first screen with a control item for borderless printing, and
in a case where the information indicates that the printing method is electrophotographic printing, causing the display to display a second screen with a second control item for printing with expanded area.

10. The information processing method according to claim 9, wherein each of the first screen and the second screen is a print setting screen for setting printing, and wherein a configuration of the print setting screen is varied in the displaying in accordance with the printing method of the printing apparatus.

11. The information processing method according to claim 10, wherein a function to be displayed on the print setting screen is varied in the displaying in accordance with the printing method of the printing apparatus.

12. The information processing method according to claim 10, wherein an arrangement order of a plurality of equivalent functions on the print setting screen is varied in the displaying in accordance with the printing method of the printing apparatus.

13. The information processing method according to claim 9, further comprising causing the display to display a status notification screen for making a status notification of the printing apparatus, wherein the status notification screen is varied in the displaying in accordance with the printing method of the printing apparatus.

14. The information processing method according to claim 13, wherein a message to be displayed on the status notification screen in a case where a sheet for performing printing in the printing apparatus is not set is varied in the displaying in accordance with the printing method of the printing apparatus.

15. The information processing method according to claim 9, wherein, as an activation screen to be displayed in a case where the application is activated, a common screen is displayed in the displaying irrespective of the printing method of the printing apparatus.

16. The information processing method according to claim 15, wherein, on the activation screen, an item for displaying a screen for obtaining acceptance of a usage survey of the printing apparatus from a user is displayed in the displaying.

17. A non-transitory computer-readable storage medium storing an application program for executing a control method of an information processing apparatus, the control method comprising:
  acquiring information regarding a printing method of a printing apparatus connected to the information processing apparatus; and
  in a case where the information indicates that the printing method is inkjet printing, causing a display of the information processing apparatus to display a first screen with a control item for borderless printing, and
  in a case where the information indicates that the printing method is electrophotographic printing, causing the display to display a second screen with a second control item for printing with expanded area.

18. The non-transitory computer-readable storage medium according to claim 17, wherein each of the first screen and the second screen is a print setting screen for setting printing, and wherein a configuration of the print setting screen is varied in the displaying in accordance with the printing method of the printing apparatus.

19. The non-transitory computer-readable storage medium according to claim 18, wherein a function to be displayed on the print setting screen is varied in the displaying in accordance with the printing method of the printing apparatus.

20. The non-transitory computer-readable storage medium according to claim 18, wherein an arrangement order of a plurality of equivalent functions on the print setting screen is varied in the displaying in accordance with the printing method of the printing apparatus.

21. The non-transitory computer-readable storage medium according to claim 17, wherein the control method further comprises causing the display to display a status notification screen for making a status notification of the printing apparatus, and wherein the status notification screen is varied in the displaying in accordance with the printing method of the printing apparatus.

22. The non-transitory computer-readable storage medium according to claim 21, wherein a message to be displayed on the status notification screen in a case where a sheet for performing printing in the printing apparatus is not set is varied in the displaying in accordance with the printing method of the printing apparatus.

23. The non-transitory computer-readable storage medium according to claim 17, wherein, as an activation screen to be displayed in a case where the application is activated, a common screen is displayed in the displaying irrespective of the printing method of the printing apparatus.

24. The non-transitory computer-readable storage medium according to claim 23, wherein, on the activation screen, an item for displaying a screen for obtaining acceptance of a usage survey of the printing apparatus from a user is displayed in the displaying.

* * * * *